(12) United States Patent
Busch et al.

(10) Patent No.: US 9,171,062 B2
(45) Date of Patent: *Oct. 27, 2015

(54) REAL-TIME SEARCH OF VERTICALLY PARTITIONED, INVERTED INDEXES

(75) Inventors: Michael Busch, Mountain View, CA (US); Rajesh M. Desai, San Jose, CA (US); Robert A. Foyle, Orange, CA (US); Magesh Jayapandian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,970

(22) Filed: Sep. 13, 2012

(65) Prior Publication Data

US 2013/0018891 A1 Jan. 17, 2013

Related U.S. Application Data

(63) Continuation of application No. 13/181,891, filed on Jul. 13, 2011.

(51) Int. Cl.
*G06F 17/30* (2006.01)
(52) U.S. Cl.
CPC .... *G06F 17/30622* (2013.01); *G06F 17/30616* (2013.01); *G06F 17/30657* (2013.01)
(58) Field of Classification Search
CPC .................... G06F 17/30622; G06F 17/30672; G06F 17/30616; G06F 17/30657

USPC .............. 707/1, 10, 100, 102, 771, 776, 779, 707/759, 763, 736, 741, 742, 704
See application file for complete search history.

(56) References Cited

U.S. PATENT DOCUMENTS

| | | | | |
|---|---|---|---|---|
| 7,634,466 B2 * | 12/2009 | Rose et al. | ............. | 707/999.002 |
| 7,636,712 B2 * | 12/2009 | Larimore et al. | ...... | 707/999.003 |
| 7,765,215 B2 | 7/2010 | Hsu et al. | | |
| 7,765,216 B2 * | 7/2010 | Li et al. | ......................... | 707/742 |
| 7,836,037 B2 * | 11/2010 | Renkes et al. | ................ | 707/705 |
| 7,849,063 B2 * | 12/2010 | Stata et al. | .................... | 707/696 |
| 8,024,322 B2 | 9/2011 | Loofbourrow et al. | | |
| 8,024,351 B2 | 9/2011 | Hornkvist | | |
| 8,090,723 B2 * | 1/2012 | Cao et al. | ...................... | 707/741 |
| 8,095,538 B2 * | 1/2012 | Hawking | ...................... | 707/728 |

(Continued)

OTHER PUBLICATIONS

Buzz, "What's Buzzing? You Tell Us! Top News and More—Yahoo! Buzz", [online], [Retrieved on Mar. 23, 2011]. Retrieved from the Internet at <URL: http://buzz.yahoo.com/>, Total 2 pp.

(Continued)

*Primary Examiner* — Jay Morrison
*Assistant Examiner* — Dangelino Gortayo
(74) *Attorney, Agent, or Firm* — Janaki K. Davda; Konrad, Raynes, Davda & Victor LLP

(57) ABSTRACT

Provided are techniques for processing a query. A query including constraints for at least two vertically partitioned, inverted indexes is received. The constraints in the query are separated based on the vertically partitioned, inverted indexes. A document identifier iterator is obtained for each of the constraints, wherein each document identifier iterator is associated with a posting list, and wherein each posting list is ordered by document identifier order. A run-time join of the posting lists is performed to obtain a final result set.

6 Claims, 39 Drawing Sheets

(56) References Cited

U.S. PATENT DOCUMENTS

| | | | |
|---|---|---|---|
| 8,117,223 B2* | 2/2012 | Patterson | 707/759 |
| 8,126,908 B2 | 2/2012 | Vasudevan et al. | |
| 8,131,540 B2* | 3/2012 | Marchisio et al. | 704/9 |
| 8,166,021 B1* | 4/2012 | Cao et al. | 707/713 |
| 8,166,045 B1 | 4/2012 | Mazumdar et al. | |
| 8,190,614 B2* | 5/2012 | Loofbourrow | 707/742 |
| 8,341,150 B1* | 12/2012 | Riley et al. | 707/728 |
| 8,498,972 B2 | 7/2013 | Transier et al. | |
| 8,560,550 B2* | 10/2013 | Patterson | 707/741 |
| 8,612,208 B2* | 12/2013 | Cooper et al. | 704/9 |
| 8,838,576 B2* | 9/2014 | Junqueira et al. | 707/713 |
| 2006/0248037 A1 | 11/2006 | Meyer et al. | |
| 2008/0133565 A1 | 6/2008 | Yasuda et al. | |
| 2008/0222117 A1 | 9/2008 | Broder et al. | |
| 2009/0210389 A1 | 8/2009 | Firestein et al. | |
| 2009/0228528 A1 | 9/2009 | Ercegovac et al. | |
| 2009/0254523 A1* | 10/2009 | Lang et al. | 707/3 |
| 2010/0057800 A1 | 3/2010 | Hawking | |
| 2010/0262597 A1 | 10/2010 | Han | |
| 2010/0299367 A1* | 11/2010 | Chakrabarti et al. | 707/803 |
| 2011/0022600 A1 | 1/2011 | Sathe et al. | |
| 2011/0040762 A1 | 2/2011 | Flatland et al. | |
| 2011/0040787 A1 | 2/2011 | Cierniak et al. | |
| 2011/0113052 A1* | 5/2011 | Hornkvist | 707/759 |
| 2011/0196855 A1 | 8/2011 | Wable et al. | |
| 2013/0041921 A1 | 2/2013 | Cooper et al. | |

OTHER PUBLICATIONS

Chavez, E. and E.S. Tellez, "A Universal Full Text Index with Access Control and Annotation Driven Information Retrieval", Proceedings of the 15th International Conference on Computing, © 2006 IEEE, Total 6 pp (Also CIC 15th International Conference on, Nov. 2006, pp. 135-140).

Cutting, D.R., D.R. Karger, and J.O. Pedersen, "Constant Interaction-Time Scatter/Gather Browsing of Very Large Document Collections", Proceedings of the 16th Annual International ACM SIGIR Conference on Research and Development in Information Retrieval, 1993, 9 pp.

Delicious, "Explore Tags on Delicious", [online], [Retrieved on Mar. 23, 2011]. Retrieved from the Internet at <URL: http://www.delicious.com/tag/>, Total 2 pp.

Digg, Inc., "Digg—All Topics—The Latest News Headlines, Videos and Images", [online], [Retrieved on Mar. 23, 2011]. Retrieved from the Internet at <URL: http://digg.com/news>, Total 3 pp.

Ercegovac, V., V. Josifovski, N. Li, M.R. Mediano, and E.J. Shekita, "Supporting Sub-Document Updates and Queries in an Inverted Index", Proceeding of the 17th ACM Conference on Information and Knowledge Management, Oct. 2008, 10 pp.

IBM, "IBM Intranet: Tagged Pages Search", [online], [Retrieved on Mar. 23, 2011]. Retrieved from the Internet at <URL: http://w3.ibm.com/search/do/tags.do>, Total 1 p.

IBM, "The Fast Search Function with the Additional Index Table to Improve Performance", IBM Technical Disclosure IPCOM000012247D, Apr. 23, 2003, Total 4 pp.

Jian, S., X. Jungang, and C. Zhiwang, "Semantic Annotation in Academic Search Engine", © 2010 IEEE, Total 5 pp (Also SWS IEEE 2nd Symposium on, Aug. 16-17, 2010, pp. 165-169).

Voorhees, E.M., "The Efficiency of Inverted Index and Cluster Searches", IBM Technical Disclosure IPCOM000148371D, May 31, 1986, Total 17 pp.

Wang, J., "Inverted Index: Index Partitioning and Distributed Realtime Search", [online], [Retrieved on Mar. 23, 2011]. Retrieved from the Internet at <URL: http://invertedindex.blogspot.com/2009/04/index-partitioning-and-distributed.html>, Total 4 pp.

Wang, J., "Inverted Index: Lucene Docid, UID Mapping and Payload", [online], [Retrieved on Mar. 23, 2011]. Retrieved from the Internet at <URL: http://invertedindex.blogspot.com/2009/04/lucene-dociduid-mapping-and-payload.html>, Total 9 pp.

U.S. Appl. No. 13/181,891, filed Jul. 13, 2011, entitled "Real-time Search of Vertically Partitioned, Inverted Indexes", invented by Busch, M., R.M. Desai, R.A. Foyle, and M. Jayapandian, Total pp. 42.

Preliminary Amendment, Sep. 13, 2012, for U.S. Appl. No. 13/181,891, filed Jul. 13, 2011 by M. Busch et al., Total pp. 7.

Office Action, dated Oct. 5, 2012, for U.S. Appl. No. 13/181,891, 40 pp.

Response to Office Action, dated Jan. 29, 2013, for U.S. Appl. No. 13/181,891, 12 pp.

Final Office Action, dated Apr. 5, 2013, for U.S. Appl. No. 13/181,891, 16 pp.

Response to Final Office Action, dated Jul. 5, 2013, for U.S. Appl. No. 13/181,891, 11 pp.

Office Action 3, Jul. 2, 2014, for U.S. Appl. No. 13/181,891, filed Jul. 13, 2011 by M. Busch et al., Total 26 pp.

Response to Office Action 3, Oct. 2, 2014, for U.S. Appl. No. 13/181,891, filed Jul. 13 2011 by M. Busch et al., Total 10 pp.

Final Office Action 2, Dec. 5, 2014, for U.S. Appl. No. 13/181,891, filed Jul. 13, 2011 by M. Busch et al., Total 20 pp.

Response to Final Office Action 2, Feb. 20, 2015, for U.S. Appl. No. 13/181,891, filed Jul. 13, 2011 by M. Busch et al., Total 10 pp.

Notice of Allowance, May 29, 2015, for U.S. Appl. No. 13/181,891, filed Jul. 13, 2011 by M. Busch et al., Total 12 pp.

* cited by examiner

Categories

Refine your results.

- ▲ Phrases
- ▲ Senders or Authors
- ▲ Recipients
- ▲ Sender Domains
- ▲ Recipient Domains
- ▲ People
- ▲ Companies
- ▲ Locations
- ▲ Concept Groups
- ▲ File Types
- ▲ Flags ⦿ New search  ○ Add to search

[ Search ]  [ Clear ]

| Flags | Date ▼▲ | File Types |
|---|---|---|
| ☐ 0 | 10/6/10 12:07 PM | 🗎 pdf |
| | Summary<br>j a n orary Internet Files\OLKCE\Final Report Ver |  |
| | ▶ Comments (1) |  |
| | ☐ John, please review these by Monday. |  |
| ☐ 0 | 2/25/00 8:32 AM | ◉ Email |
| | Summary<br>Everything is going well. Sorry I haven't gotten t |  |
| | ▶ Comments (1) |  |
| | ☐ John, this document isn't important |  |
| ☐ 0 | 2/24/00 3:35 AM | ◉ Email |
| | Summary<br>Yes I am! Let me know what time you are availa |  |
| | ▶ Comments (1) ▲ Entire thread (2) |  |

FIG. 6D

| Senders or Authors | Recipients | Attachments | File Siz |
|---|---|---|---|
| sion Final 004.doc </p> <<<n<RRENT FINANCI M/t o/r n b n echanisms 51 </p><p>Sources s 5 p>Proportion of t | | | 4,023 |
| eda_admin, October 6, 2010 3:56:07 PM PDT | | | |
| Ella <Ella@somecompany.com> | Julia <Julia@lotusspace.com> | | 1 |
| ack to you, but I have been really busy at work and with other things. I will give a call when I get a chance. "Edward Neme | | | |
| eda_admin, October 6, 2010 4:00:42 PM PDT | | | |
| Ella <Ella@somecompany.com> | Michelle <Michelle@someplace.com> | | 5 |
| able and where you are this week and I will pick an appropriate location. G$ and Nacious E are available. You need a nickn | | | |

Near duplicates (2) — 640

FIG. 6E

Categories

Refine your results.

▲ Phrases
▲ Senders or Authors
▲ Recipients
▲ Sender Domains
▲ Recipient Domains
▲ People
▲ Companies
▲ Locations
▲ Concept Groups
▲ File Types
▲ Flags ⦿ New search  ○ Add to search

[Search] [Clear]

| Flags | Date ▼▲ | File Types |
|---|---|---|
| ☐ | 0  2/2/00 5:46 AM | ⓔ Email |
| | Summary  Hempstead.>>Assistant District attorney:Ben | |
| | ▶ Comments (1) | |
| | ☐ John, please review these by Monday. | |
| ☐ | 0  1/27/00 5:28 AM | ⓔ Email |
| | Summary  I noticed that there was one bio missing. So he | |
| | ▶ Comments (1) | |
| | ☐ John, please review these by Monday. | |
| ☐ | 0  11/29/99 8:45 AM | ⓔ Email |
| | Summary  Arnold, Do you have a name and number of the | |
| | ▶ Comments (1) | |

FIG. 7D

| Senders or Authors | Recipients | Attachments | File Size |
|---|---|---|---|
| Ella <Ella@somecompany.com> | Michelle <Michelle@someplace.com> | | 4 |
| Crossland said the >>passengers of the>> >unidentified couple from ... | | | |
| eda_admin, October 6, 2010 3:56:07 PM PDT | | | |
| Ella <Ella@somecompany.com> | Michelle <Michelle@someplace.com>, Ethan <Et | | 2 |
| re goes, Eric Gillaspie: 28 Junior Attorney extradonaire for Enron ... dance steps, and lapsing into seizures resulting in the to | | | |
| eda_admin, October 6, 2010 3:56:07 PM PDT | | | |
| Ella <Ella@somecompany.com> | Brianna <Brianna@somecompany.com> | | 3 |
| Plains attorneys (or someone who has their number) so I can discuss the ... Agreement I think you should talk to their attor | | | |

Current Case: caseC

Administration | Audit Log | Search

610 — Administration
620 — Audit Log
600 — Search

Search

Keywords: 
Sender: 
Recipient: 
Subject: 
Dates between: mm/dd/yyyy : mm/dd/yyyy
Comment text:

Suggested Terms ( meeting AND CommentAuthor:eda_admin )

Time Line | Email Diagram | Cat...

7
0

10 results (0 selected)
☐ Select all

Actions

FIG. 8D

Categories
Refine your results.

- ▲ Phrases
- ▲ Senders or Authors
- ▲ Recipients
- ▲ Sender Domains
- ▲ Recipient Domains
- ▲ People
- ▲ Companies
- ▲ Locations
- ▲ Concept Groups
- ▲ File Types
- ▲ Flags ● New search   ○ Add to search

[ Search ]  [ Clear ]

— 820

| Flags | Date ▼▲ | File Types |

☐ 0   10/6/10 12:07 PM   📄 pdf
  Summary
  5 Working Groups and bilateral meetings 5 Doss
  ▶ Comments (1)
  ☐ John, please review these by Monday.

☐ 0   2/23/00 8:31 AM   ◉ Email
  Summary
  Stephanie, Could you please add me to the distr
  ▶ Comments (1)
  ☐ John, please review these by Monday.

☐ 0   2/18/00 2:09 AM   ◉ Email
  Summary
  call. We are meeting some of her friends out for
  ▶ Comments (1)

| Senders or Authors | Recipients | Attachments | File Siz... |
|---|---|---|---|
| ...iers on ANSPs 6 3. THE IMPLICATIONS OF THE LEGISLATION 10 ... possible. We have done this using Open StakeholderiMe... | | | 4,023 |
| ...eda_admin, October 6, 2010 3:56:07 PM PDT | | | |
| Ella <Ella@somecompany.com> | Katie <Katie@somecompany.com> | | 2 |
| ...ibution list for these types of :meetings:. Thanks ... actg Further to my earlier e-mail, attached is updated information for:me... | | | |
| ...eda_admin, October 6, 2010 3:56:07 PM PDT | | | |
| Ella <Ella@somecompany.com> | Michelle <Michelle@someplace.com> | | 2 |
| ...dinner and drinks and then some sweet sweet love. Seriously, this girl is... | | | |

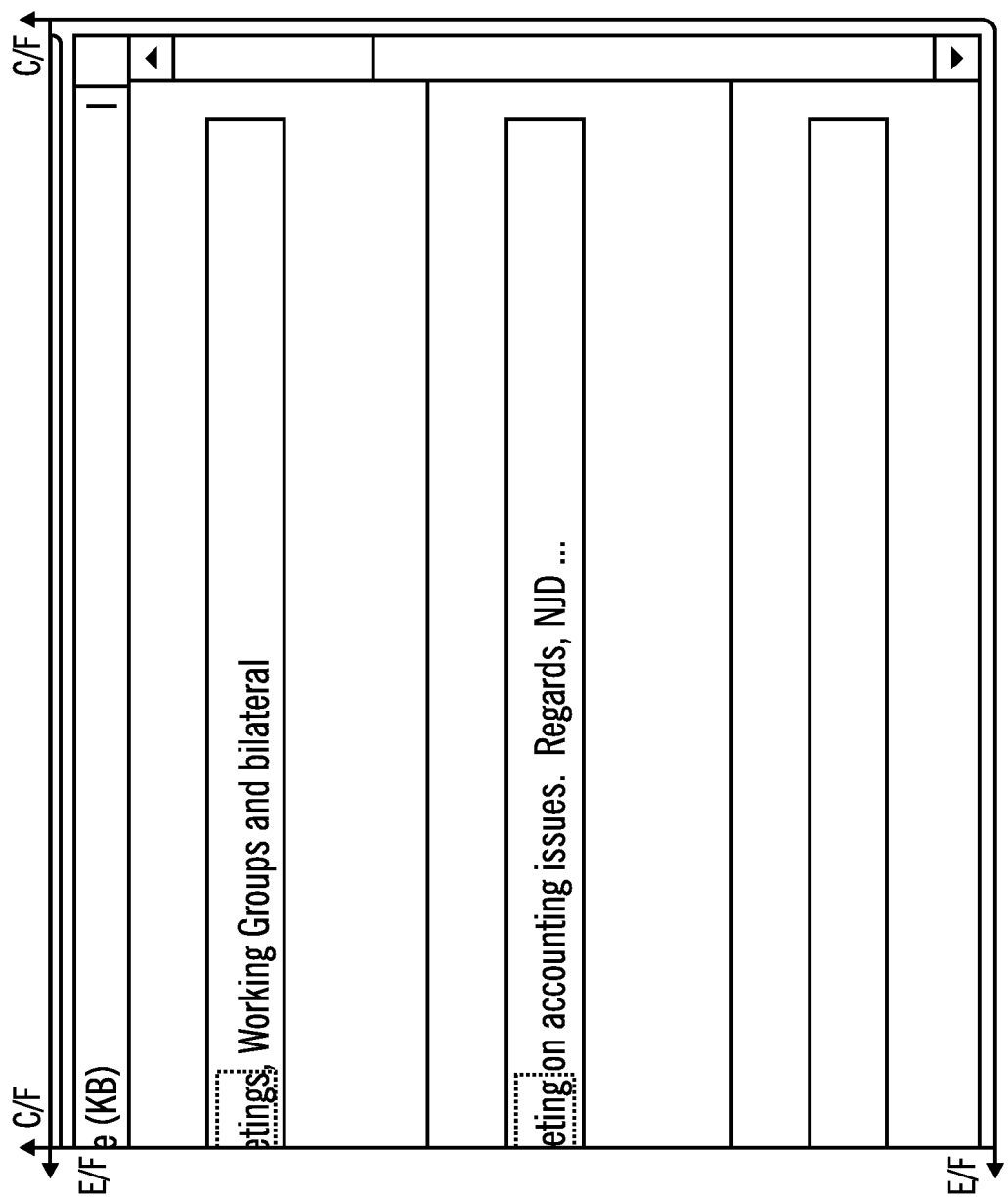

FIG. 9D

| Senders or Authors | Recipients | Attachments | File Size |
|---|---|---|---|
| iers on ANSPs 6 3. THE IMPLICATIONS OF THE LEGISLATION 10 ... possible. We have done this using Open Stakeholder Me | | | 4,023 |
| eda_admin, October 6, 2010 3:56:07 PM PDT | | | |
| Ella <Ella@somecompany.com> | Katie <Katie@somecompany.com> | | 2 |
| ibution list for these types of meetings. Thanks ... actg Further to my earlier e-mail, attached is updated information for me | | | |
| eda_admin, October 6, 2010 3:56:07 PM PDT | | | |
| Ella <Ella@somecompany.com> | Michelle <Michelle@someplace.com> | | 2 |
| dinner and drinks and then some sweet sweet love. Seriously, this girl is... | | | |

| Suggested Terms | ? |
| Categories | ? |

Refine your results.
▲ Phrases
▲ Senders or Authors
▲ Recipients
▲ Sender Domains
▲ Recipient Domains
▲ People
▲ Companies
▲ Locations
▲ Concept Groups ⦿ New search  ○ Add to search    [Search]  [Clear]

| Flags | Date ▼▲ | File Types |
|---|---|---|
| ☐ | 1 ▯ 1/19/00 4:49 AM | ◉ Email |

Summary
Let's see. Meeting Kristi at a bar. All signs poir

▶ Comments (1)
⬚ John, these are not important.

| ☐ | 1 ▯ 1/17/00 7:59 AM | ◉ Email | eda_a

Summary
message.On the basis of the meeting held in ou

▶ Comments (1)
⬚ John, these are not important.

| ☐ | 1 ▯ 11/29/99 8:45 AM | ◉ Email | eda_

Summary
Draft.1. In Paragraph 1.1, they removed my requ

▶ Comments (1)

1010

| Senders or Authors | Recipients | Attachments | File Siz |
|---|---|---|---|
| Ella <Ella@somecompany.com> | Michelle <Michelle@someplace.com>, Ethan <Et | | 2 |
| t to YES.Ryan.F.Ruppert@EXXON.sprint.com on 01/19/2000 08:28 …F.Subject: Dive Club Meeting> Hello everyone, >>Ha | | | |
| dmin, October 6, 2010 3:57:08 PM PDT | | | |
| Ella <Ella@somecompany.com> | Samantha <Samantha@somecompany.com> | | 3 |
| offices on Monday with representatives of your company, Niels Udengaard, … | | | |
| dmin, October 6, 2010 3:57:08 PM PDT | | | |
| Ella <Ella@somecompany.com> | Brianna <Brianna@somecompany.com> | | 3 |
| irement of installing a system to meet all of Enron's electrical power … date. My draft had a date established by Enron sol | | | |

REAL-TIME SEARCH OF VERTICALLY PARTITIONED, INVERTED INDEXES

CROSS-REFERENCE TO RELATED APPLICATION

This application is a continuation of U.S. patent application Ser. No. 13/181,891, filed Jul. 13, 2011, which application is incorporated herein by reference in its entirety.

BACKGROUND

Embodiments of the invention relate to real-time search of vertically partitioned, inverted indexes.

The users of documents in a repository often annotate one or more documents or parts of a document using annotations (also referred to as markers). Also, users who search for information in documents, either on the World Wide Web (i.e., WWW or web) or in content repositories, sometimes annotate documents. These user annotations are potentially useful to their creators at a later time or are useful to other users immediately.

These annotations may be notes, comments, tags, instructions to other team members, etc., and are auxiliary content that is distinct from the content of the document. An annotation may be as short as a one-word tag or as long as a multi-paragraph remark. Annotations attached to a document may contain helpful notes for the user the next time they refer to the document or contain information or instructions to communicate to other users. Annotations also make it easier to find the document in the repository. As the use of annotations increases, some annotations become more popular than others.

As annotations are used more, they are also more useful for searching.

SUMMARY

Provided are a method, computer program product, and system for processing a query. A query including constraints for at least two vertically partitioned, inverted indexes is received. The constraints in the query are separated based on the vertically partitioned, inverted indexes. A document identifier iterator is obtained for each of the constraints, wherein each document identifier iterator is associated with a posting list, and wherein each posting list is ordered by document identifier order. A run-time join of the posting lists is performed to obtain a final result set.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
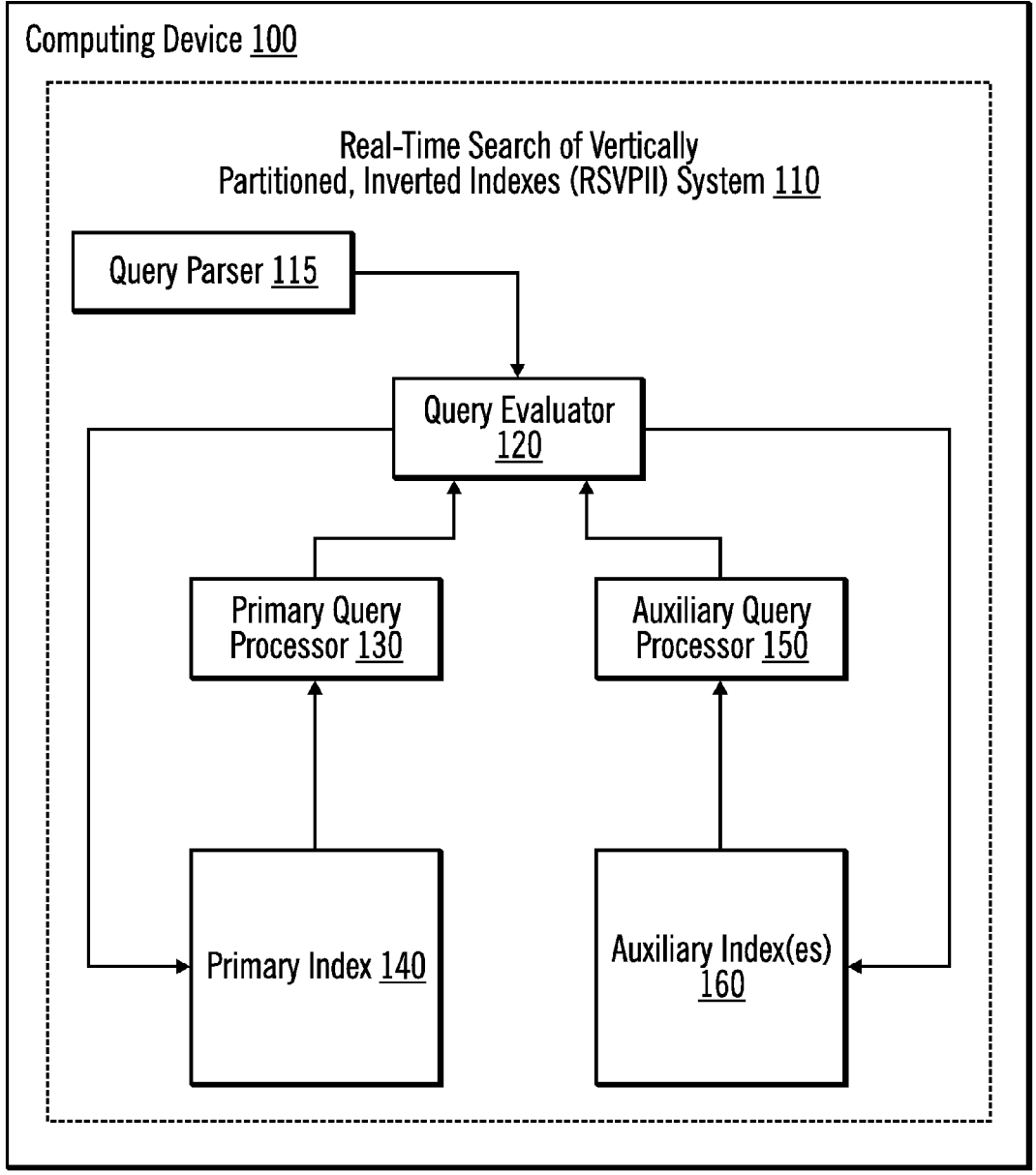
FIG. 1 illustrates, in a block diagram, a computing device for real-time search of vertically partitioned, inverted indexes in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

To query unstructured data, such as text documents in a repository, web pages, emails, etc., the documents are indexed and stored in a full text index (i.e., a document index), which is an inverted index data structure. These documents can be queried using different query models such as Boolean, Vector space, Probabilistic, etc. An inverted index is a data structure for efficiently querying unstructured data. This index is a sparse data structure that maps document terms to the documents that contain them. Each index has a dictionary which is the set of unique terms in the corpus. Each term is associated with a posting list, which is a list of IDs of documents containing the term. The results of an unstructured query are returned in ranked order. Metrics, such as precision and recall, are used to evaluate the quality of the result set.

In database systems, structured data are stored and queried in a different way. These data are typically relational and are stored in a relational database. A relational database is a set of tables with relationships between them. Unlike inverted indexes, databases are typically optimized (normalized) so that tables are not sparse. Relational data are queried using Structured Query Language (SQL). The query can specify the order of the result set.

For a typical search application, a single inverted index is sufficient for a given corpus because an inverted index is designed to optimally store and retrieve sparse data. Some search applications use multiple inverted indexes, each for a different corpus of documents, such as documents in a repository, web pages, news articles, tags, etc. A single search query can return data from multiple indexes, which are presented together using a predefined template. Some search engines allow users to search for documents by document content (from a text index) or by tag (from a tag index).

Indexes can be partitioned horizontally for reasons such as scalability. A single large index can be broken into smaller indexes each with a subset of the documents. A partition function may be used to assign documents to different sub-indexes. At search time, the query is scattered across the sub-indexes and the results are gathered to produce the final result set. Since the intermediate results all have the same document structure, a "join" in this context is actually a union operation.

A search application updates documents by removing the old document from the inverted index and inserting a new (i.e., modified) document into the inverted index.

Run-time joins are common in database querying, but typical search applications do not employ run-time joins. In a database, the tables have relationships with other tables (which are clearly defined at design time), and a join operation relies on these relationships for the results to be meaningful. In the world of structured data, databases are designed to support data updates as well as queries.

For unstructured data, documents from different corpuses (different indexes) tend to be heterogeneous in nature. In the search domain, inverted indexes are used to ingest data once, but be queried many times. Ideally, optimizations are done at indexing time so that query execution remains fast. A search application may be designed such that update operations are expensive to keep query cost low. In other systems, a common document model is imposed on two separate parallel indexes, which allows them to be queried without needing any join.

Some social bookmarking services allow users to annotate web pages with tags that are publicly visible. A tag is a kind of user annotation (e.g., a document annotation) that is associated with a document Annotations made by users are stored dynamically in an inverted index, which is separate from the full text index. The search engine allows users to search both the document content as well as the user annotation content in real-time, i.e., as soon as an annotation is made, it is searchable. That is, documents and annotations are stored in separate inverted indexes. Users can either search for documents containing a particular annotation (or multiple annotations) or they can search for documents based on document content (i.e., documents that contain one or more terms). In the latter case (document content search), the annotations of each document are also displayed in the search result.

Some search engines allow users to query multiple heterogeneous sources of data in a single search. With one query, a user can retrieve not only web documents, but also other sources of information, such as news articles, people profiles, data from a database or content repository, images, video, content from social networks etc. The results from each inverted index are unrelated to each other (aside from containing the query terms) and can be combined and presented to the user on a single page (or multiple pages if the number of results is large).

In some systems, all of the data of interest is in a single inverted index. In some systems, documents in an inverted index may be partially updated, without having to remove and re-index them. When the contents of annotations to a document are co-located with the contents of the document, this affects how the document will be ranked within the results of a query. The frequency of occurrence of a term in a document and in annotations influences document ranking. There are some auxiliary fields, such as user annotations, that are optional and less frequently present in an inverted index. When optional fields are stored in the same inverted index as the mandatory fields, then all queries, access all the fields in the document.

Run-time joins are in use in systems such as databases. Some systems use run-time joins of database tables to support text search. This is done by creating temporary database tables for a given query and joining these tables at runtime using database joins.

FIG. 1 illustrates a computing device 100 for real-time search of vertically partitioned, inverted indexes in accordance with certain embodiments. The computing device 100 includes a Real-time Search of Vertically Partitioned, Inverted Indexes (RSVPII) system 110. In certain embodiments, the RSVPII system 110 may be described as a component of a search application that allows users to search data.

The RSVPII system 110 includes a query parser 115, a query evaluator 120, a primary query processor 130, and one or more auxiliary query processors 150. In certain embodiments, the primary query processor 130 is a standard query processor. In certain embodiments, each auxiliary query processor 150 is a custom query processor that performs re-ordering of results. Each query processor 130, 150 is a predicate evaluator and is at a lowest level of a query parse tree. Moreover, the input to each query processor 130, 150 is a search term, and the output of each query processor 130, 150 is a document ID iterator that allows the query evaluator 120 to iterate document identifiers (IDs) matching that term.

The RSVPII system 110 also includes a primary index 140 (e.g., a text index) and one or more auxiliary indexes 160 (e.g., annotation indexes, such as a comments index, a tags index, etc.). The primary index 140 and the one or more auxiliary indexes 160 are vertically partitioned, inverted indexes. For each vertically partitioned, inverted index 140, 160, the RSVPII system 110 provides a different query processor 130, 150.

In certain embodiments, there is a separate auxiliary index 160 for each type of annotation (one for tags, one for comments, etc.). In alternative embodiments, there is one auxiliary index 160 for all types of annotations.

With the vertically partitioned, inverted indexes 140, 160, a logical document is vertically partitioned into the multiple, inverted indexes 140, 160 with the core content of documents stored in the inverted primary index 140 and auxiliary content stored in one or more inverted auxiliary indexes 160. A logical document comprises an original text document, meta-data, and the annotations associated with the document. If a document is removed from the primary index 140, corresponding auxiliary content is removed from the one or more auxiliary indexes 160.

In an inverted index, a document is a collection of terms. Each document has a unique identifier called a document ID which is a monotonically increasing value. This document ID is generated when the document is indexed, i.e., when the document is added to the primary index 140. When a document is indexed, each term in the document is added to the dictionary of the primary index 140, and the document ID is added to the posting list for that term. Since document IDs monotonically increase, the posting list for a term is always in increasing order of document IDs. A posting list may also store additional information about the document besides just the document ID, which is called a payload.

The primary index 140 and the auxiliary indexes 160 are vertically partitioned indexes built using the actual text documents and the annotations, respectively. Since both the primary index 140 and the auxiliary indexes 160 are inverted indexes, they each have a set of documents, but each set has a different document model. In the primary index 140, each document represents a text document, while in each auxiliary index 160, each document represents an annotation. In the primary index 140, the posting list for each term is a set of document IDs that correspond to a set of text documents, while in each auxiliary index 160, posting lists are sets of document IDs, each of which denotes an annotation. Within the payload of each annotation, the RSVPII system 110 stores the document ID of the annotated text document. Storing document IDs in payloads enables fast execution of run-time joins. Another reason to store document IDs in payloads is to maintain stable identifiers of documents if needed by the search application. Posting lists and payloads are sequentially stored on disk and can be sequentially accessed when required. Due to this, accessing payloads adds very little to the cost of iterating through a posting list.

The RSVPII system 110 system provides search capabilities enabling users to index and search documents located in one or more content repositories. These documents can be annotated either by users or by automated processes (e.g. analyzers). Annotations can be added, modified or deleted at any time (e.g., during the review process). Annotations can be searched in real-time. That is, as soon as a document is annotated (e.g., tagged or commented on), any user (i.e., the one performing the annotations or another user) can search for that document using terms in those annotations.

Users are allowed to search for documents that contain a particular set of terms. They can also search for documents having a certain kind of annotation. Moreover, the RSVPII system 110 allows users to search for documents whose content includes a desired set of terms and which also has a certain annotation. Because the documents and annotations are stored in separate inverted indexes 140, 160, a run-time join is used to obtain the search results. The annotations in the auxiliary indexes 160 are not ordered by document, to parallel the document index. The order of annotations in the auxiliary indexes 160 is independent of the order of documents in the primary index 140.

User annotations are more dynamic than document content. Users can add, change or remove annotations at any rate during search. This means that the inverted auxiliary index 160 that stores the annotations also incurs frequent updates. Documents are often indexed once and searched many times. Then, the RSVPII system 110 may perform index refreshing (to ensure that all the latest changes are available to all users), etc. and to provide real-time search.

The RSVPII system 110 finds documents based on the annotation by searching multiple indexes (i.e., both the primary index 140 and the one or more auxiliary indexes 160) in a single query. In particular, the RSVPII system 110 allows the content of the document to be used in conjunction with annotations to find the desired set of documents. With embodiments, a single query can search for both documents by document content (from the primary index 140) or by tag (from a tag index, such as an auxiliary index 160) simultaneously.

The following are example queries processed by the RSVPII system 110:
  Find documents that contain the terms "Storage" and "Speed", which have also been tagged "Database-related".
  Find documents that contain the word "meeting" that have a comment addressing a reviewer "John".
  Which documents tagged as "Requiring Second Level Review" were commented on by "Smith" yesterday?
  Display emails that contain the word "lawsuit", that were tagged as "Confidential", and that were sent during the month of January in 2001.

The RSVPII system 110 performs a run-time join followed by result-reordering that combines data from two vertically partitioned inverted indexes 140, 160. With embodiments, the user is able to make sense of ranking of results when the documents come from different corpuses and have different structures. Thus, the RSVPII system 110 can locate a document with a frequently used annotation that may not be easy to find by annotation alone.

With the RSVPII system 110, the query evaluator 120 performs joins at run-time. First, the indexing structure has at least two vertically partitioned, inverted indexes 140, 160 because the at least two vertically partitioned, inverted indexes 140, 160 have different update frequencies, and updates occur in different phases of the search application. Second, the at least two vertically partitioned, inverted indexes 140, 160 vary in size relative to one another. The smaller auxiliary indexes 160 are the ones updated more frequently and updated at query time. Finally, the ranking of documents in the auxiliary indexes 160 (i.e., the smaller indexes) is irrelevant to the final result order. This ensures that combining documents from multiple indexes 140, 160 does not complicate result ordering. These factors enable the RSVPII system 110 to provide run-time joins to answer queries with constraints to multiple indexes 140, 160 with different document models. A constraint may be described as a condition that data is required to satisfy to be returned as a result. A query predicate (i.e., predicate) may be described as a part of a query that specifies a constraint and is used in the context of a query model. In certain embodiments, the constraints may be document constraints (that specify terms to be searched in the primary index 140) and annotation constraints (that specify terms to be searched in one or more auxiliary indexes 160). The RSVPII system 110 may be extended to other applications that allow complex queries on multiple vertically partitioned, inverted indexes that are interrelated, but stored separately.

In certain embodiments, the auxiliary indexes 160 are much smaller than the primary index 140 (for example, if the number of tags or comments is much smaller than the number of documents).

With the RSVPII system 110, results from each inverted index 140, 160 are related to each other and are combined at query time. Also, different query constraints are applied to different inverted indexes, and the results from each inverted index 140, 160 are pieced together to construct each final result.

There are some auxiliary fields, such as user annotations, that are optional. The RSVPII system 110 stores the optional fields in one or more separate inverted indexes 160 so that the cost of accessing these optional fields is not incurred for queries that do not require them. Also, with vertical separation, in search results, auxiliary data can be concealed from users who aren't authorized to view them. With the RSVPII system 110, with vertical inverted index partitioning, at query time, the results from multiple partitions are joined to produce the final results.

With the RSVPII system 110, the presence of annotations, regardless of how many, does not influence the ranking of search results. This is possible because annotations and documents are stored separately.

With the RSVPII system 110, the cost of executing queries with document constraints only (which is very common) is not influenced by the presence of annotations because annotations are stored in a separate inverted index.

With the RSVPII system 110, any update to an auxiliary index 160 is inexpensive because the index is small and independent of the much bigger primary index 140.

With the RSVPII system 110, since each auxiliary index 160 (e.g., a comment index) is decoupled from the primary index 140, refreshing the auxiliary index 160 after annotation updates is quick. This allows for real-time search.

With the RSVPII system 110, the run-time join between the primary index 140 and the auxiliary indexes 160 allows queries having both text and annotation constraints to return results to users.

The RSVPII system 110 supports the following types of queries:
  1. Text queries: All the predicates apply to the full text index only. The query evaluator 120 uses the primary query processor 130 to evaluate these queries, incurring no overhead due to the presence of an annotation index.

2. Text and Annotation queries: To support text and annotation predicates in a single query, the query parser 115 identifies whether a predicate should be applied to the text index or to the annotation index. Each predicate is evaluated against its respective index 140, 160.

3. Annotation queries: All the predicates apply to the annotation index, and the result is a set of text documents.

Figure 2:
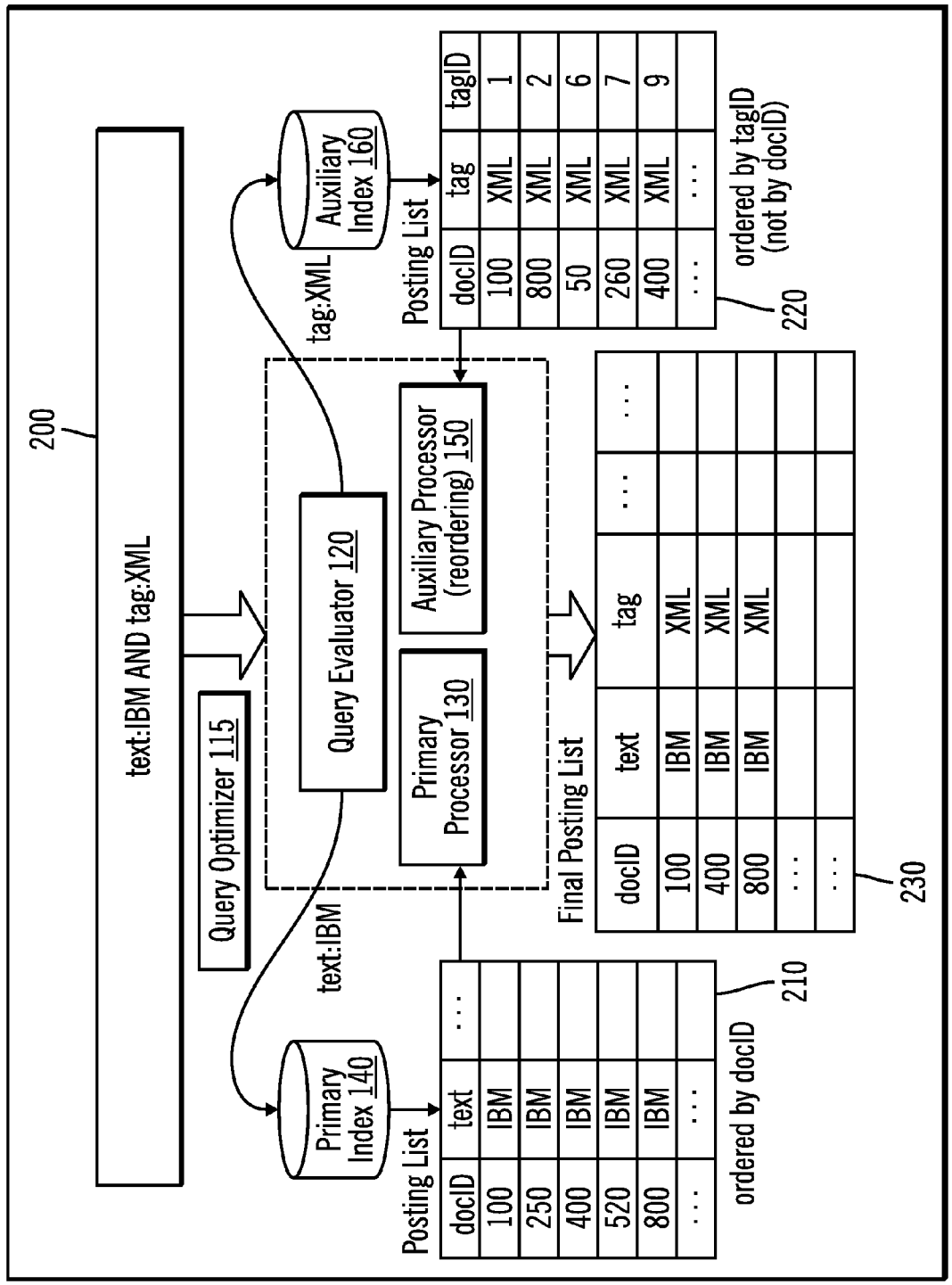
FIG. 2 illustrates, in a block diagram, further details of real-time search of vertically partitioned, inverted indexes in accordance with certain embodiments.

FIG. 2 illustrates, in a block diagram, further details of real-time search of vertically partitioned, inverted indexes in accordance with certain embodiments. In the example of FIG. 2, the query parser 115 parses a query with constraints 200. The constraints 200 include a document constraint "text: IBM" and an annotation constraint "tag: XML". The query parser 115 identifies the different types of constraints. The query parser 115 passes the parsed query to the query evaluator 120. In this example, the query evaluator 120 issues a search of the document constraint "text: IBM" against the primary index 140, which generates a document posting list 210 ordered by document ID from the primary index 140. The primary query processor 130 reads the document posting list 210. The query evaluator 120 issues a search of the annotation constraint "tag: XML" against the auxiliary index 160, which generates an annotation posting list 220 that is not ordered by document ID from the auxiliary index 160. An auxiliary query processor 150 reads the annotation posting list 220, and the auxiliary query processor 150 re-orders the annotation posting list 220 by document ID.

The primary query processor 130 passes the document posting list 210 to the query evaluator 120. The auxiliary query processor 150 passes the re-ordered annotation posting list 220 to the query evaluator 120. The query evaluator 120 performs a run-time join of the document posting list 210 and the re-ordered annotation posting list 220 to form the final posting list 230. The query evaluator 120 issues a response to the query. The posting lists 210, 220, and 230 are logical representations that are provided to enhance understanding of embodiments of the invention, but a posting list is typically a list of document IDs and may contain a payload.

When a query is executed, query evaluator 120 analyzes the constraints of the query and then evaluates the constraints individually, using their respective inverted indexes 140, 160. Each such evaluation produces a posting list, and these posting lists are merged and intersected depending on the operators in the query. However, these operations can be expensive because the posting lists aren't ordered the same way. The posting list from the primary index 140 is in document order, while the results from each auxiliary index 160 are in annotation order. But with the help of document IDs in the annotation payloads, the auxiliary query processor 150 logically rearranges the annotations in document order. Once the annotation posting lists are in the same order, the auxiliary query processor 150 performs a run-time join by scanning the annotation posting lists in sequence and combining documents and annotations that have the same document ID. In a database, this kind of join is called a sort-merge join because the relations to be joined are first sorted, then merged using primary key—foreign key relationships. Since the number of annotations is typically much smaller than the number of text documents, a similar ratio can be expected in query results as well. Since the payloads are collocated on disk and are accessible sequentially (both of which lower the IO cost), run-time join operations is neither expensive in terms of execution time nor in terms of memory consumption.

At the query processing level, the RSVPII system 110 provides a new type of query operation that is added to support the run-time join operation. However, this operation is not exposed explicitly at the query specification level. Also, the query parser 115 is able to detect, from a given query, when a run-time join operation is required, and, if so, to build a query parse tree that contains the new operation the correct positions in the query parse tree. In certain embodiments, this new operation can be incorporated into the existing query processing framework with the help of an extension that implements a traditional iterator interface, but instead of simply producing a posting list of annotations ranked by some field-based scoring function, the extension produces a posting list of annotations ordered by document ID. In certain embodiments, the run-time sorting by payload uses a bit set for efficiency.

Figure 3:
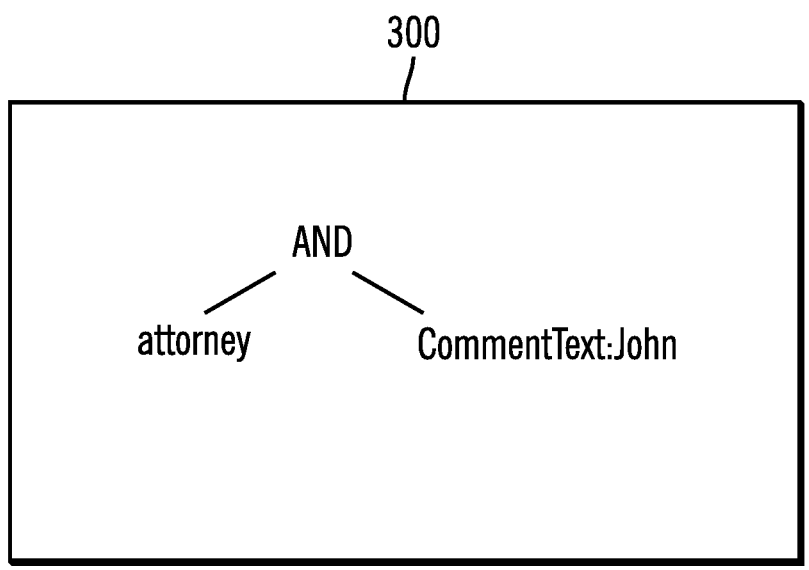
FIG. 3 illustrates a query parse tree in accordance with certain embodiments.

FIG. 3 illustrates a query parse tree 300 in accordance with certain embodiments. In the query parse tree 300, "Comment-Text:John" will be represented by a new auxiliary query processor 150 and is different from the primary query processor 130 for "attorney". Moreover, "AND" is the operator in the query parse tree 300.

If the query contains multiple constraints on each index, the query parser 115 classifies each constraint as being a text constraint or an annotation constraint. The query evaluator 120 executes each type of constraint separately prior to the joining of the results from the multiple indexes 140, 160. In certain embodiments, the query syntax includes conjunctive queries with positive constraints. In additional embodiments, more complex queries, including negative constraints, are supported.

Figure 4A:
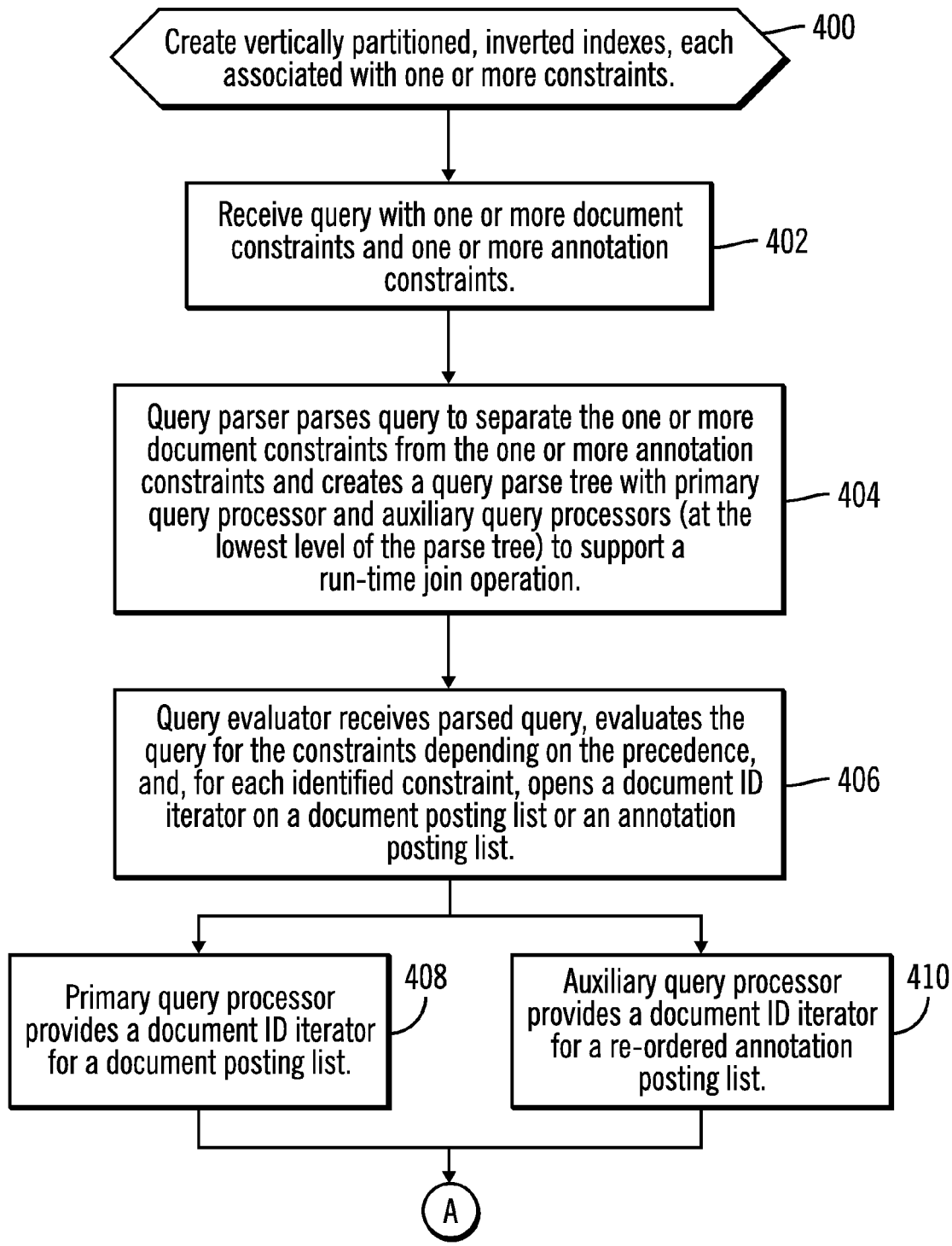
FIGS. 4A and 4B illustrate, in a flow diagram, processing to perform real-time search of vertically partitioned, inverted indexes for document and annotation constraints in accordance with certain embodiments.
Figure 4B:
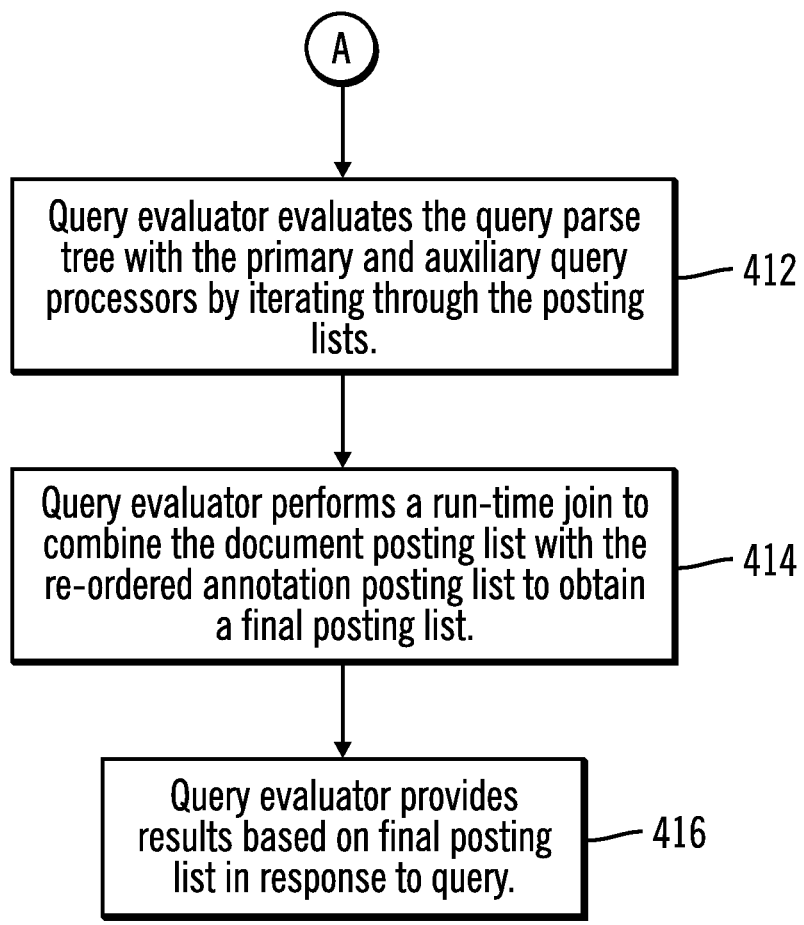

FIGS. 4A and 4B illustrate, in a flow diagram, processing to perform real-time search of vertically partitioned, inverted indexes for document and annotation indexes in accordance with certain embodiments. Control begins at block 400 in which vertically partitioned, inverted indexes (i.e., the primary index 140 and one or more auxiliary indexes 160) are created, with each of the vertically partitioned, inverted indexes 140, 160 associated with one or more constraints. In certain embodiments, the RSVPII 110 creates the primary and auxiliary indexes 140, 160. In block 402, the query evaluator 120 receives a query with one or more document constraints and one or more annotation constraints.

In information retrieval, a Boolean query consists of predicates and operators. A query predicate consists of one or more terms to be matched with terms in the inverted indexes 140, 160. Similar to how documents are analyzed and processed before being inserted in the primary index 140, query predicates are also analyzed, expanded, and rewritten before being searched for in the inverted indexes 140, 160. The evaluation of a Boolean query entails executing each term predicate and combining the results based on the operators between them.

In block 404, the query parser 115 parses the query to separate the one or more document constraints from the one or more annotation constraints and to create a query parse tree with the primary query processor 130 (at the lowest level of the query parse tree) and with the auxiliary query processors 150 (at the lowest level of the query parse tree) to support a run-time join operation.

In block 406, the query evaluator 120 receives the parsed query, evaluates the query for the constraints (i.e., terms or leaf nodes of a query tree) depending on the precedence, and, for each identified term, opens a document ID iterator on a document posting list or an annotation posting list (depending on the constraint). Precedence may be described as the order in which operators in an expression are evaluated. The posting lists are traversed to generate result sets depending on the term. A document ID iterator allows the query evaluator 120 to iterate the documents IDs from a posting list one at a time.

From block 406, processing may continue to blocks 408 and 410. In certain embodiments, the processing of blocks 408 and 410 is in parallel. In certain alternative embodiments, the processing of blocks 408 and 410 is sequential.

In block 408, the primary query processor 130 provides a document ID iterator for a document posting list. In block 410, the auxiliary query processor 150 provides a document ID iterator for a re-ordered annotation posting list. The details of creating the re-ordered annotation posting list are described with reference to FIG. 5. From blocks 408 and 410, processing continues to block 412 (FIG. 4B).

In block 412, the query evaluator 120 evaluates the query parse tree with the primary and auxiliary query processors (at the lowest level of the query parse tree) by iterating through the document posting list and the annotation posting list. In block 414, the query evaluator 120 performs a run-time join to combine the document posting list with the re-ordered annotation posting list to obtain a final posting list. In block 416, the query evaluator 120 provides results (e.g., a document list) in response to the query. The results may be displayed on a computer screen for a user.

Figure 5:
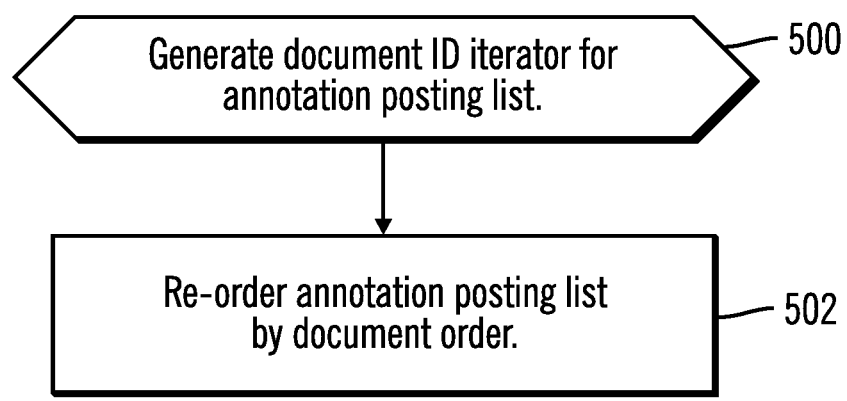
FIG. 5 illustrates, in a flow diagram, processing performed by an auxiliary processor in accordance with certain embodiments.
Figure 6A:
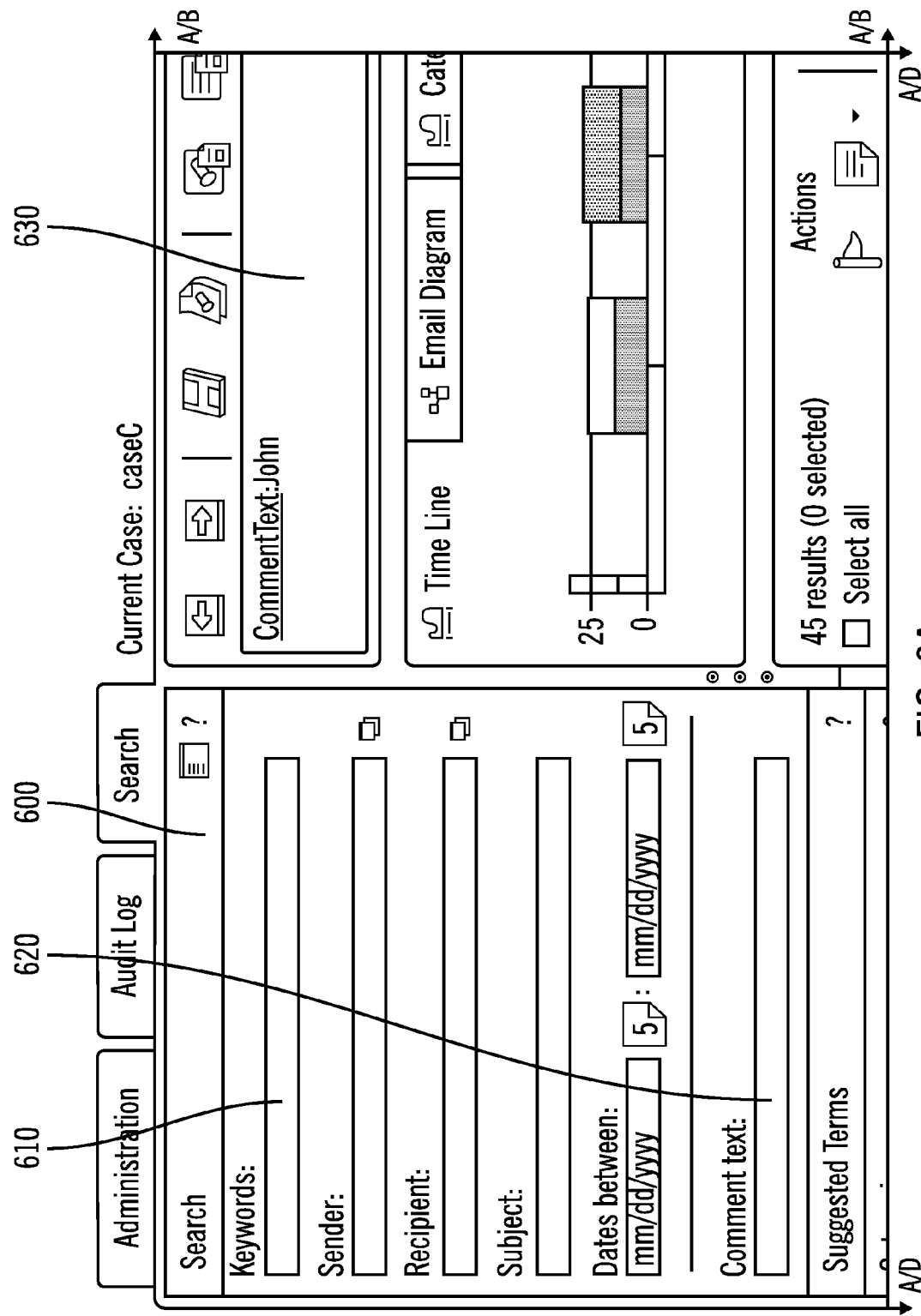
FIGS. 6A-10F illustrate, in block diagrams, user interfaces showing example queries in accordance with certain embodiments.
Figure 6B:
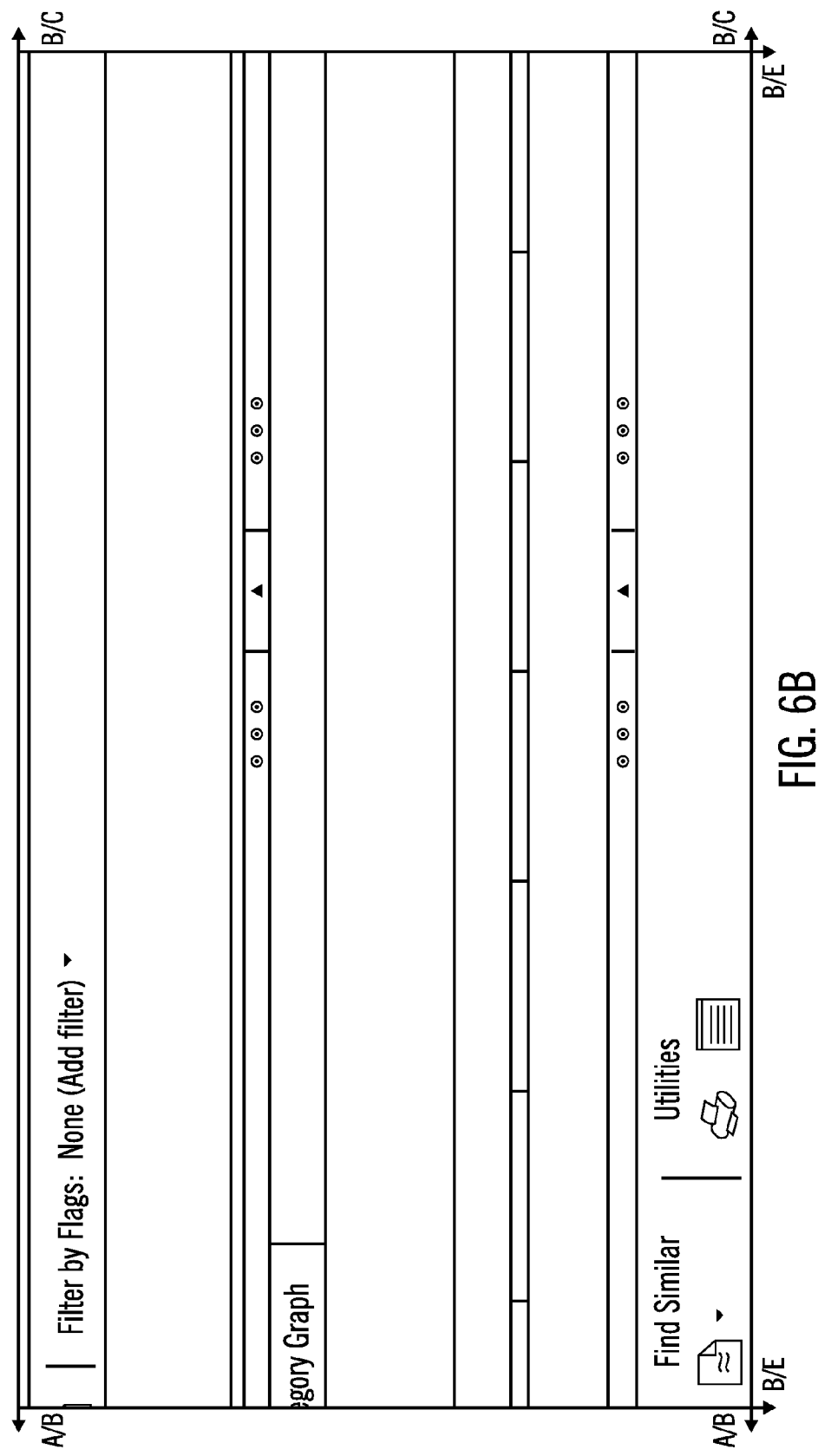
Figure 6C:
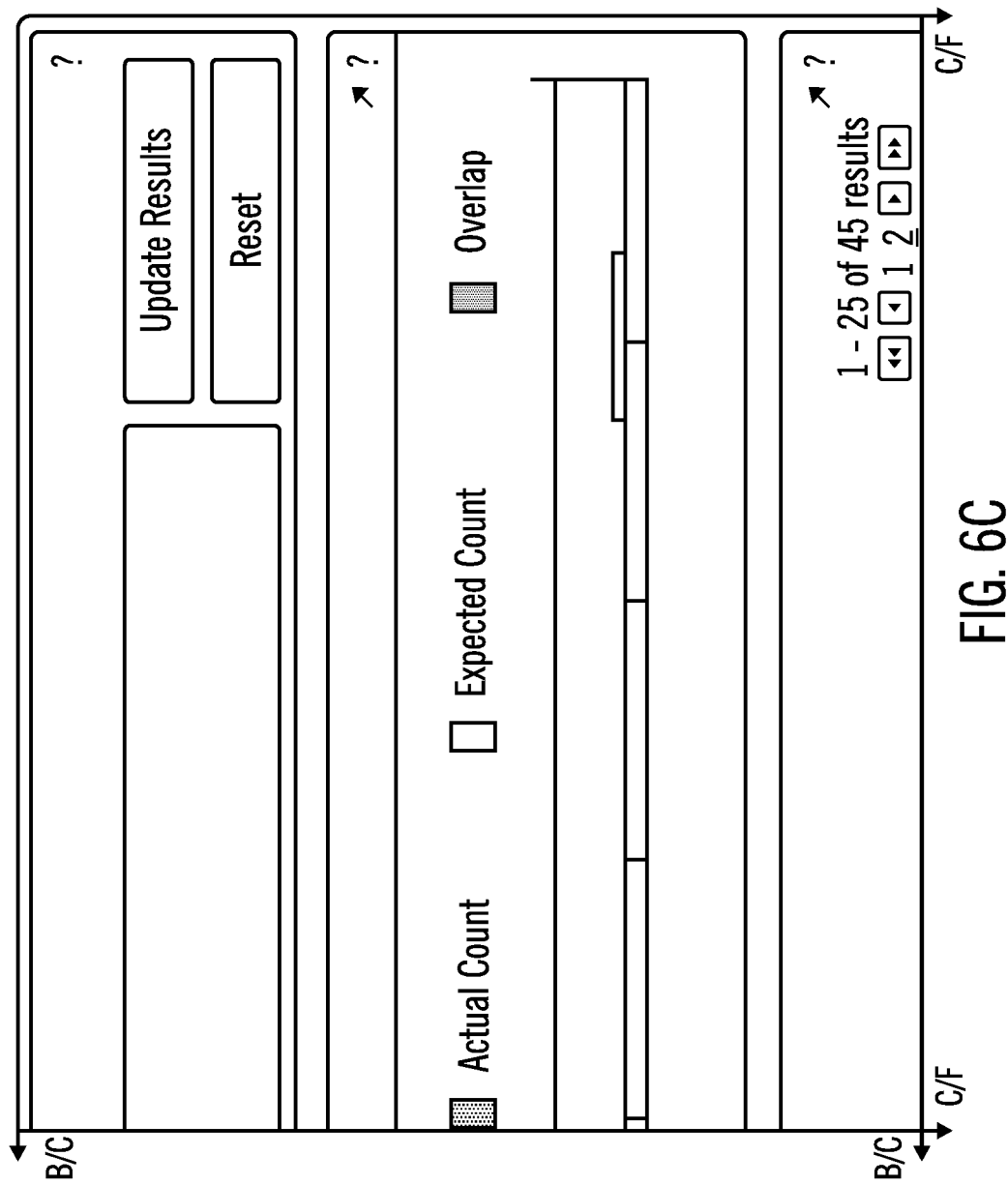
Figure 6F:
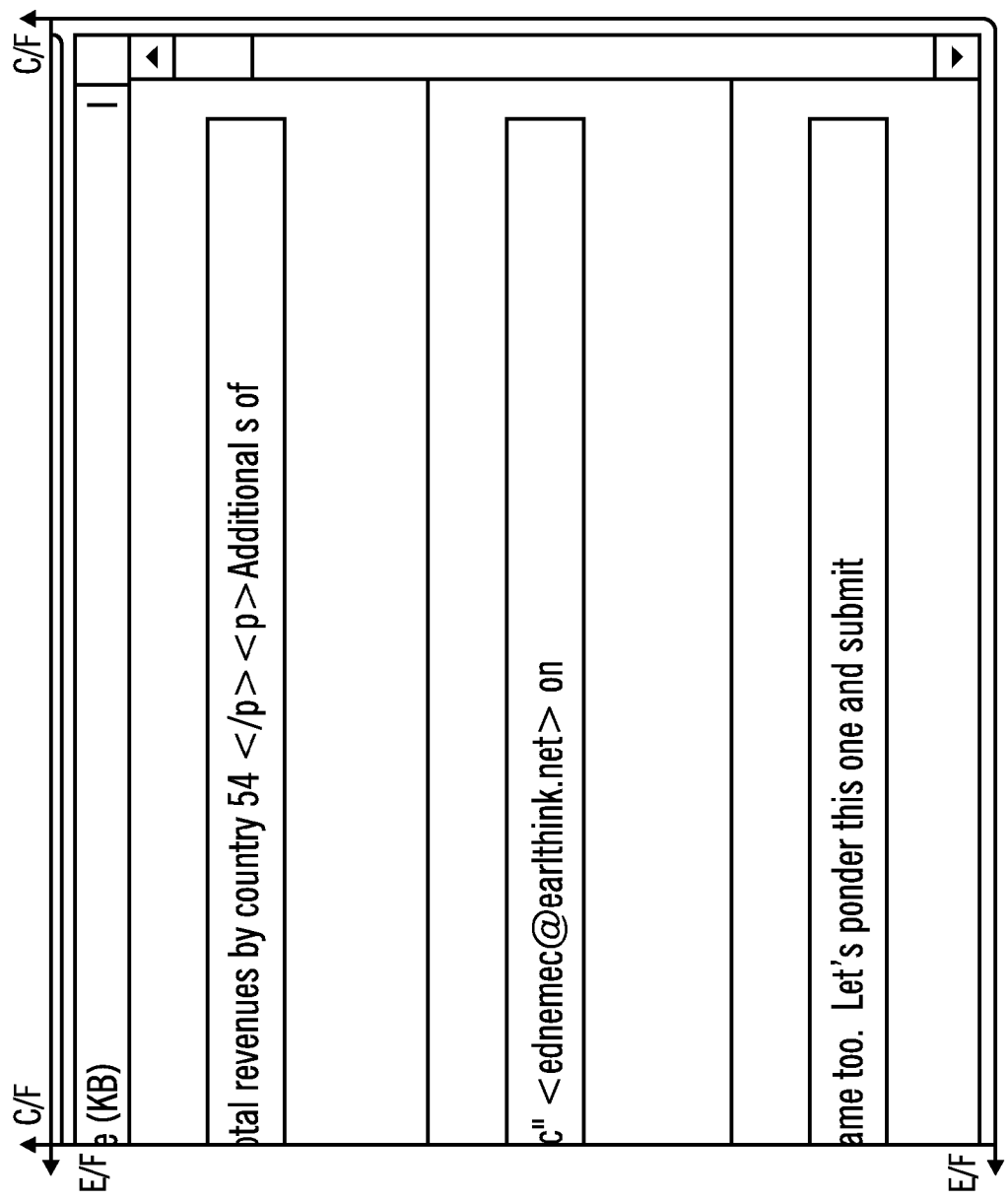
Figure 7A:
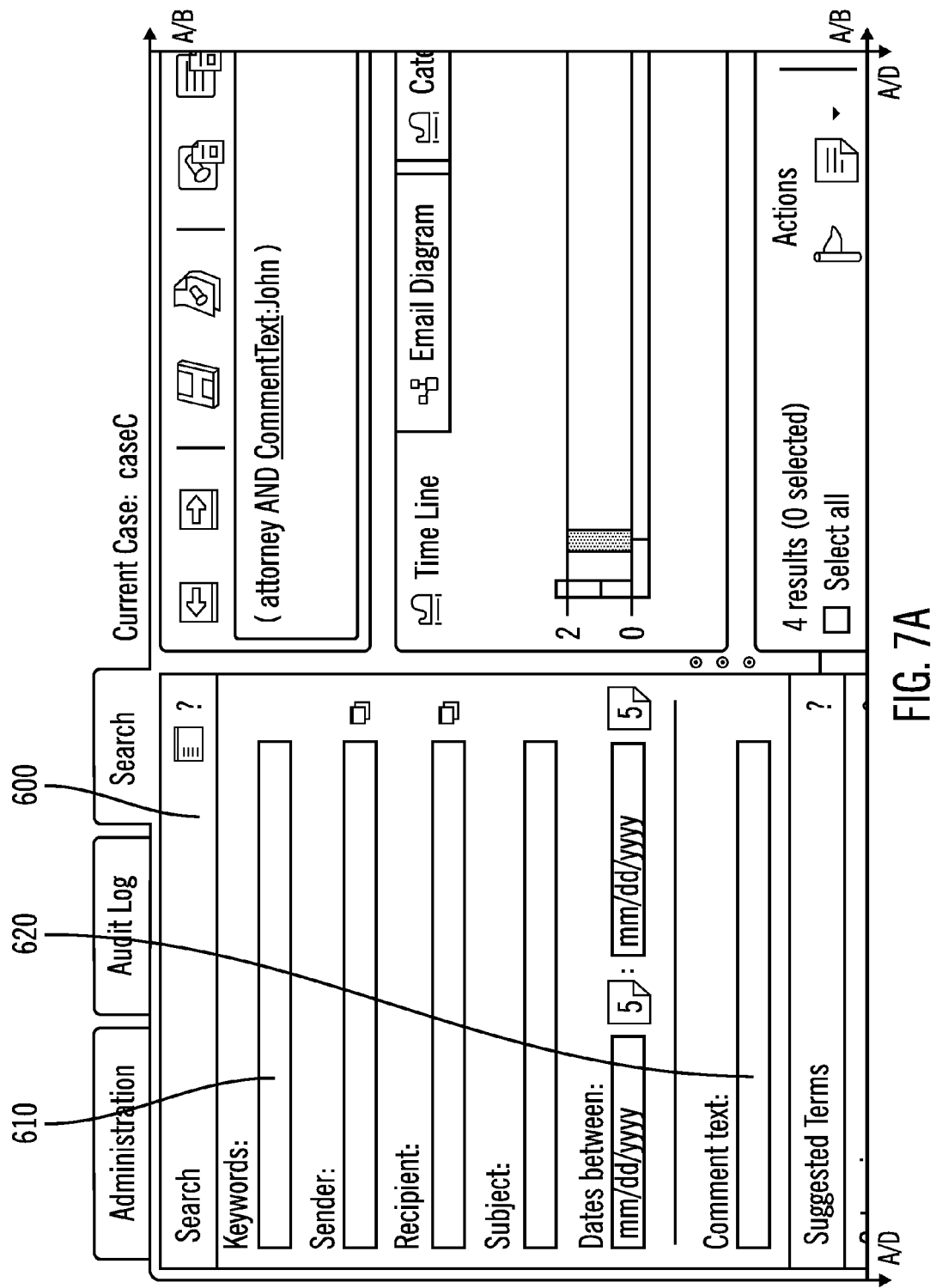
Figure 7B:
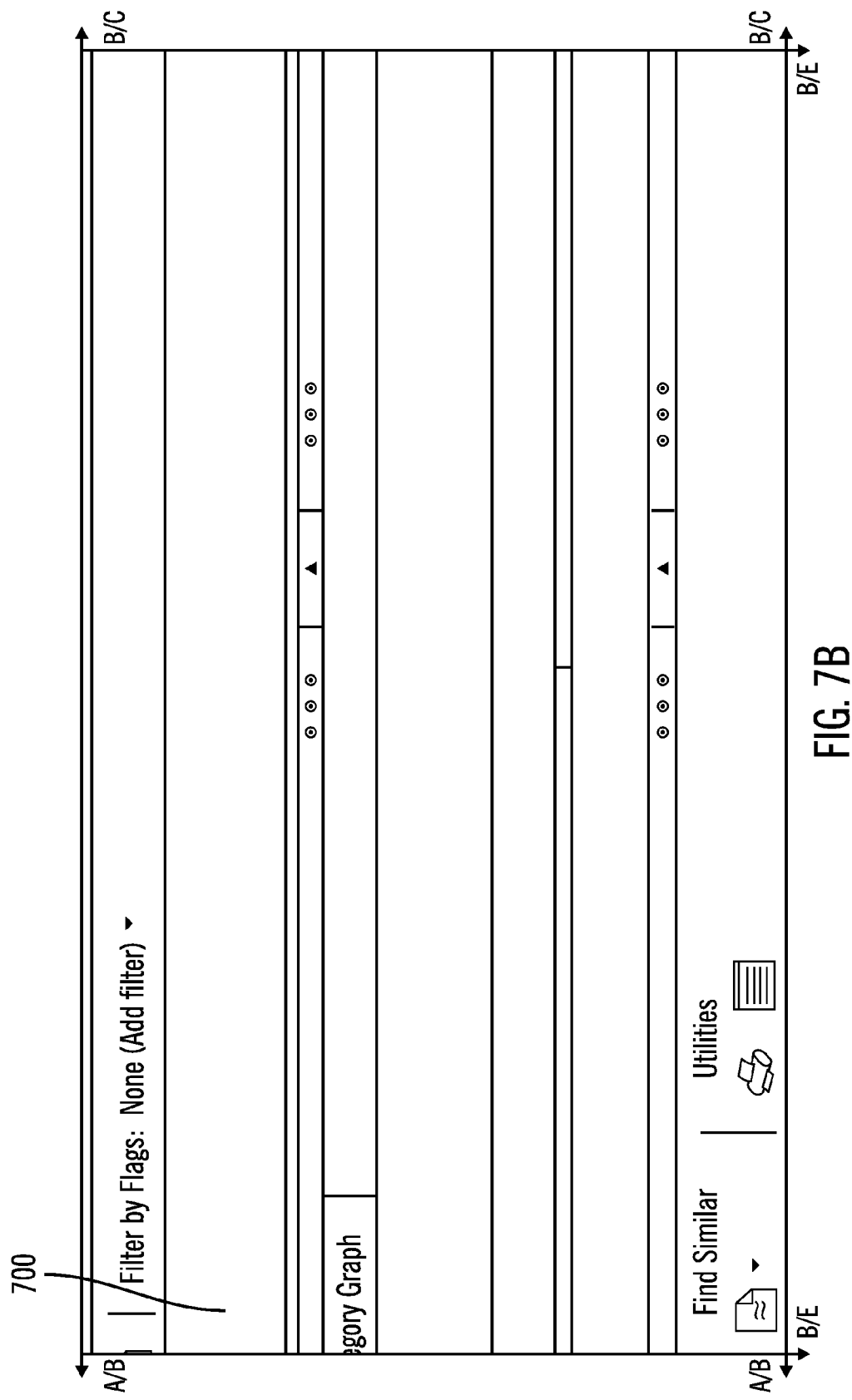
Figure 7C:
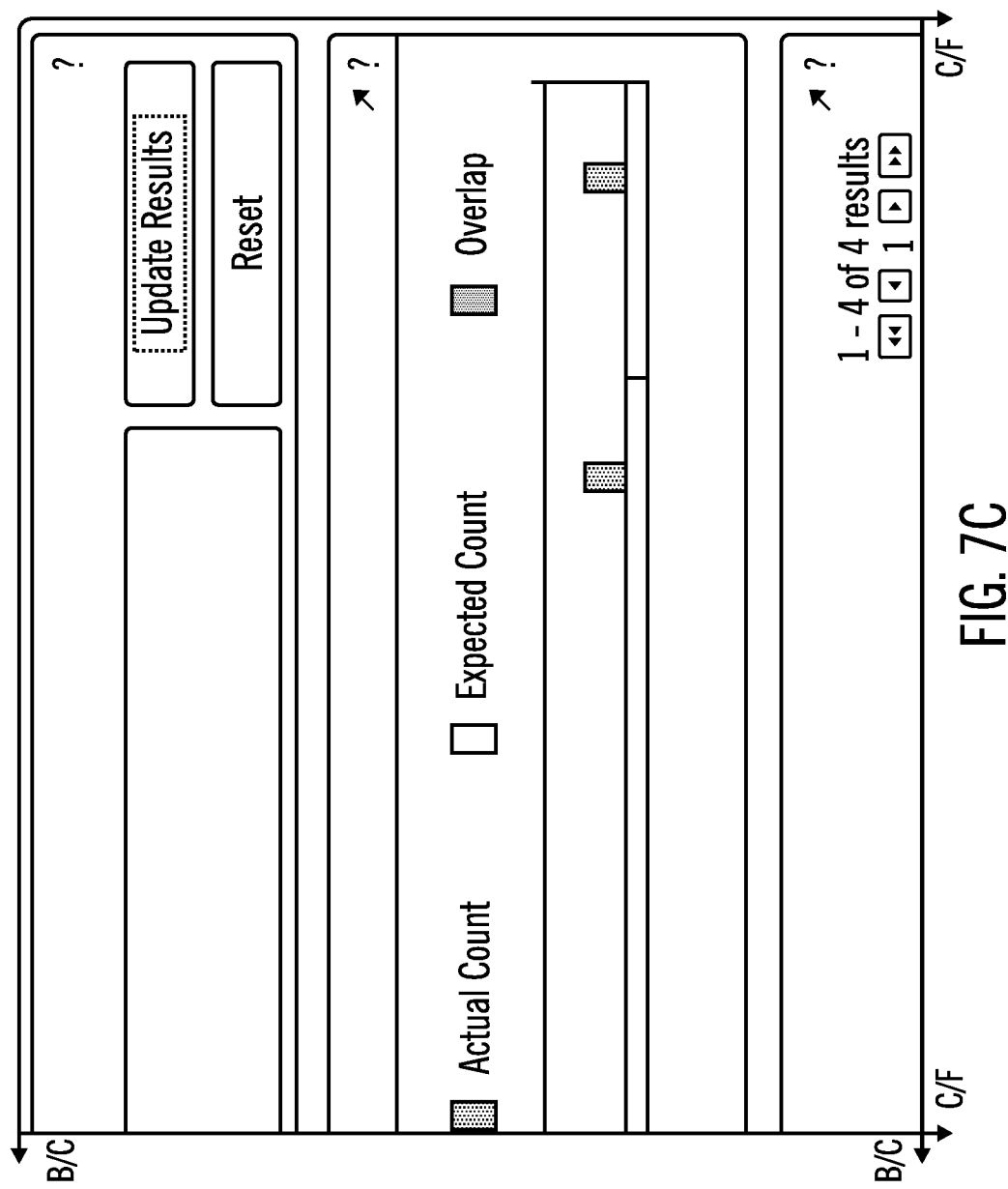
Figure 7F:
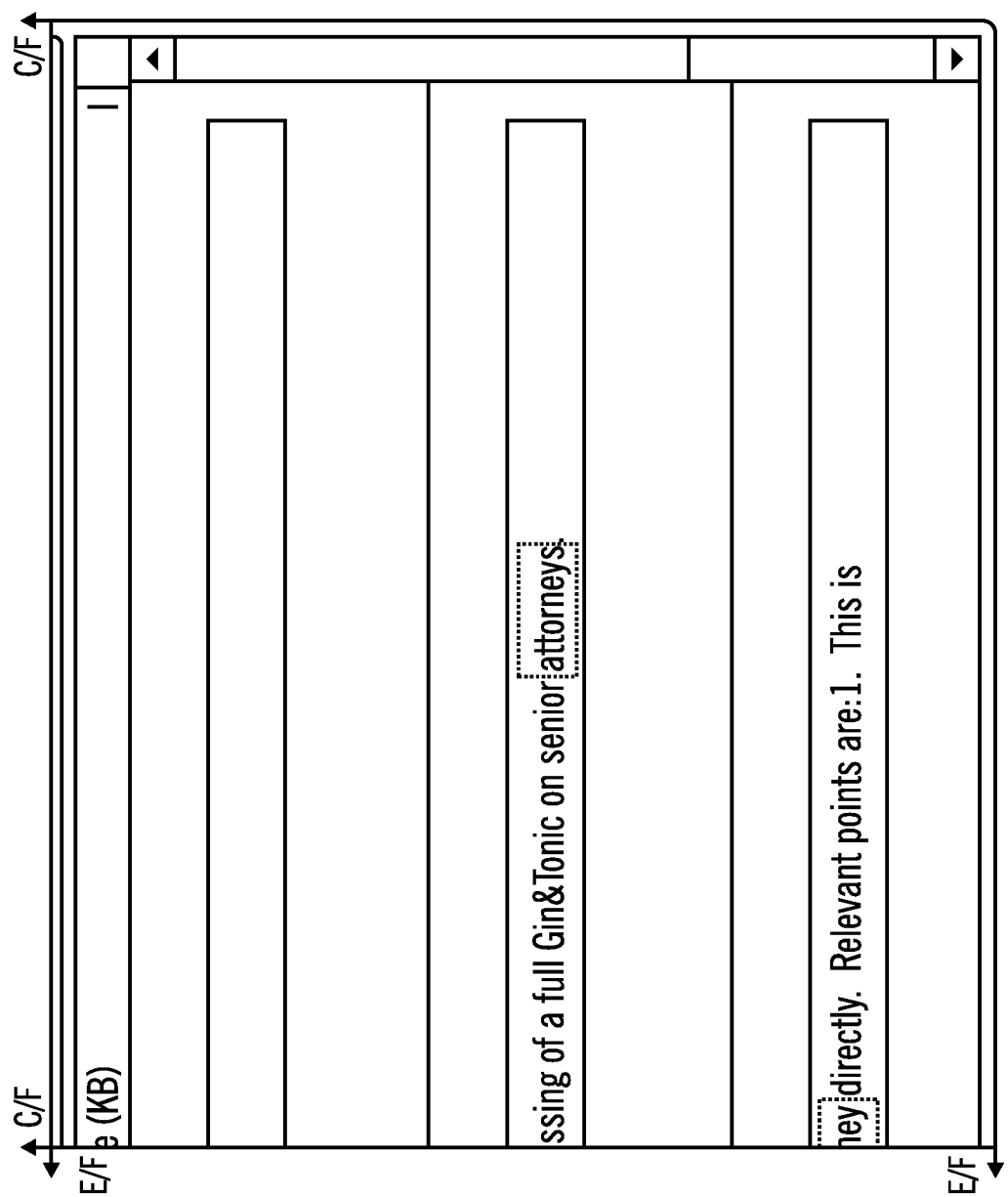
Figure 8B:
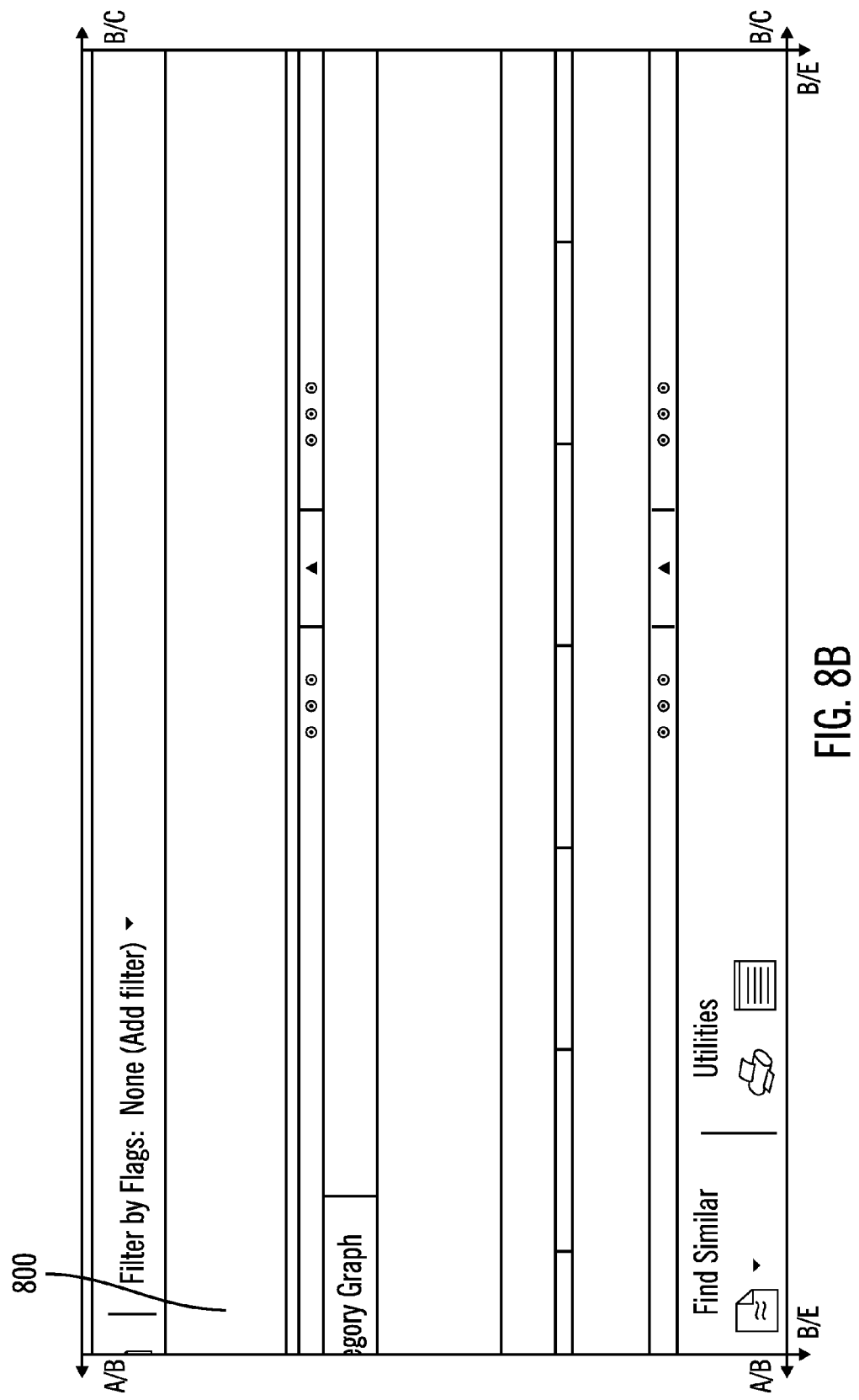
Figure 8C:
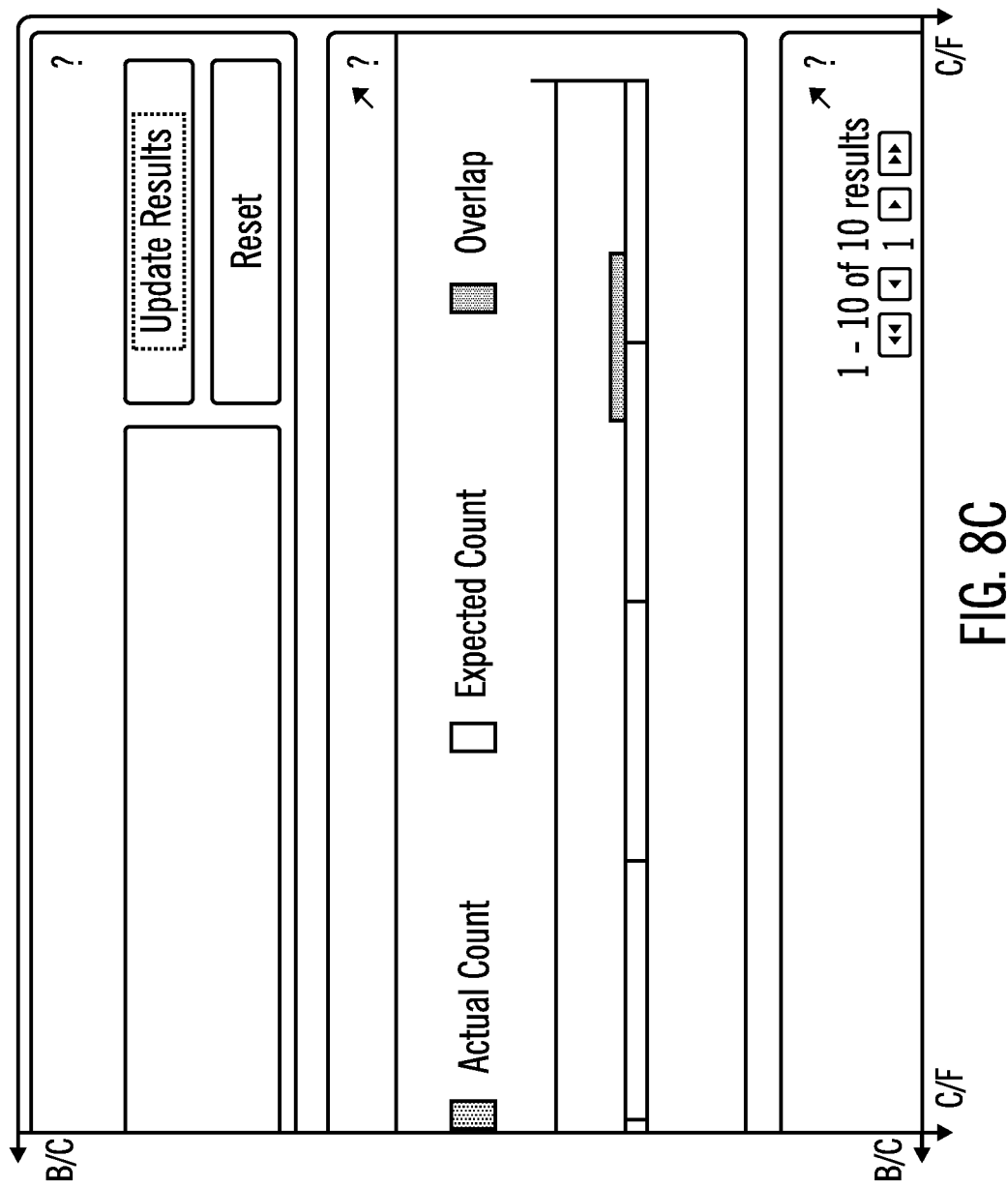
Figure 9A:
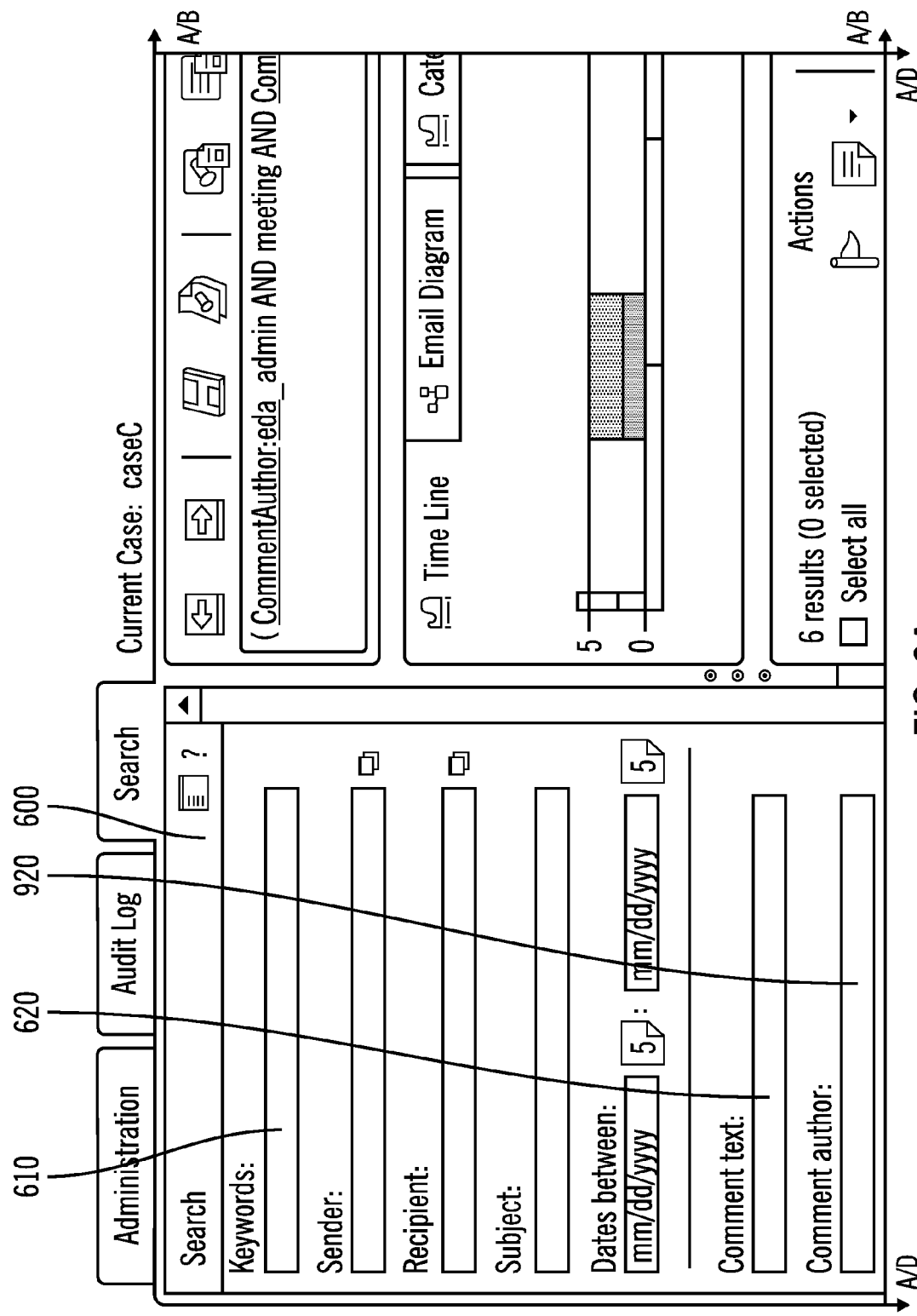
Figure 9B:
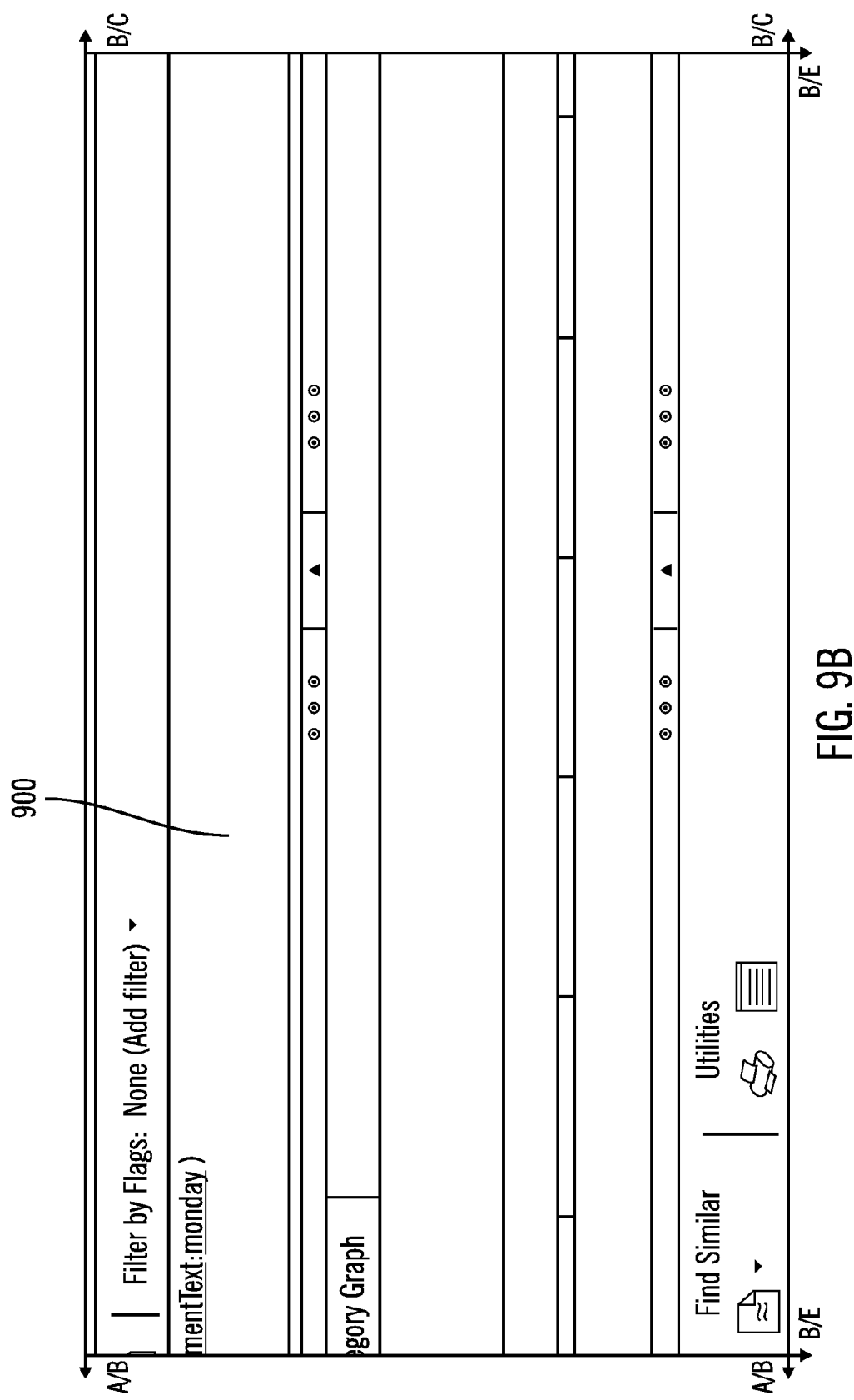
Figure 9C:
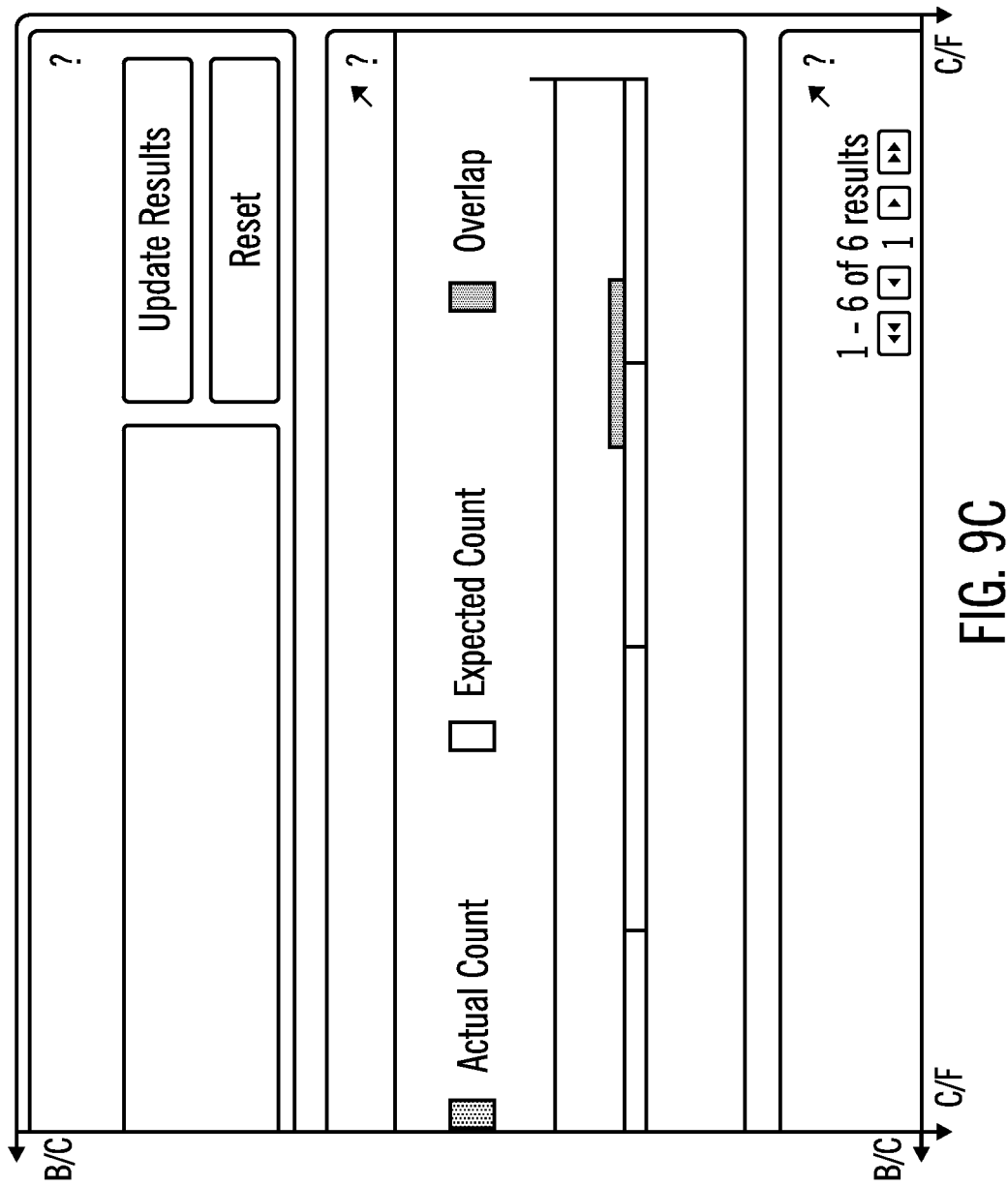
Figure 9F:
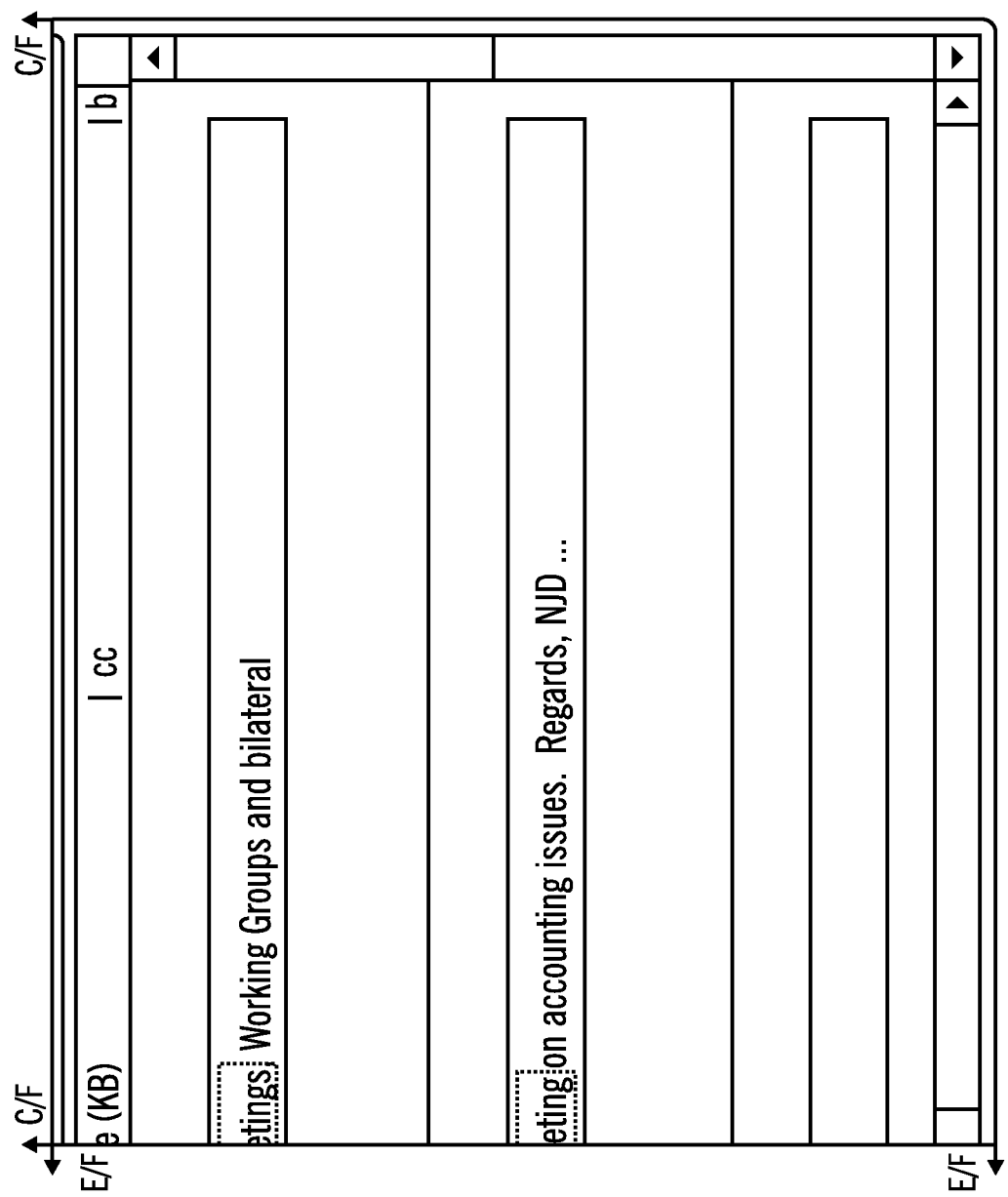
Figure 10A:
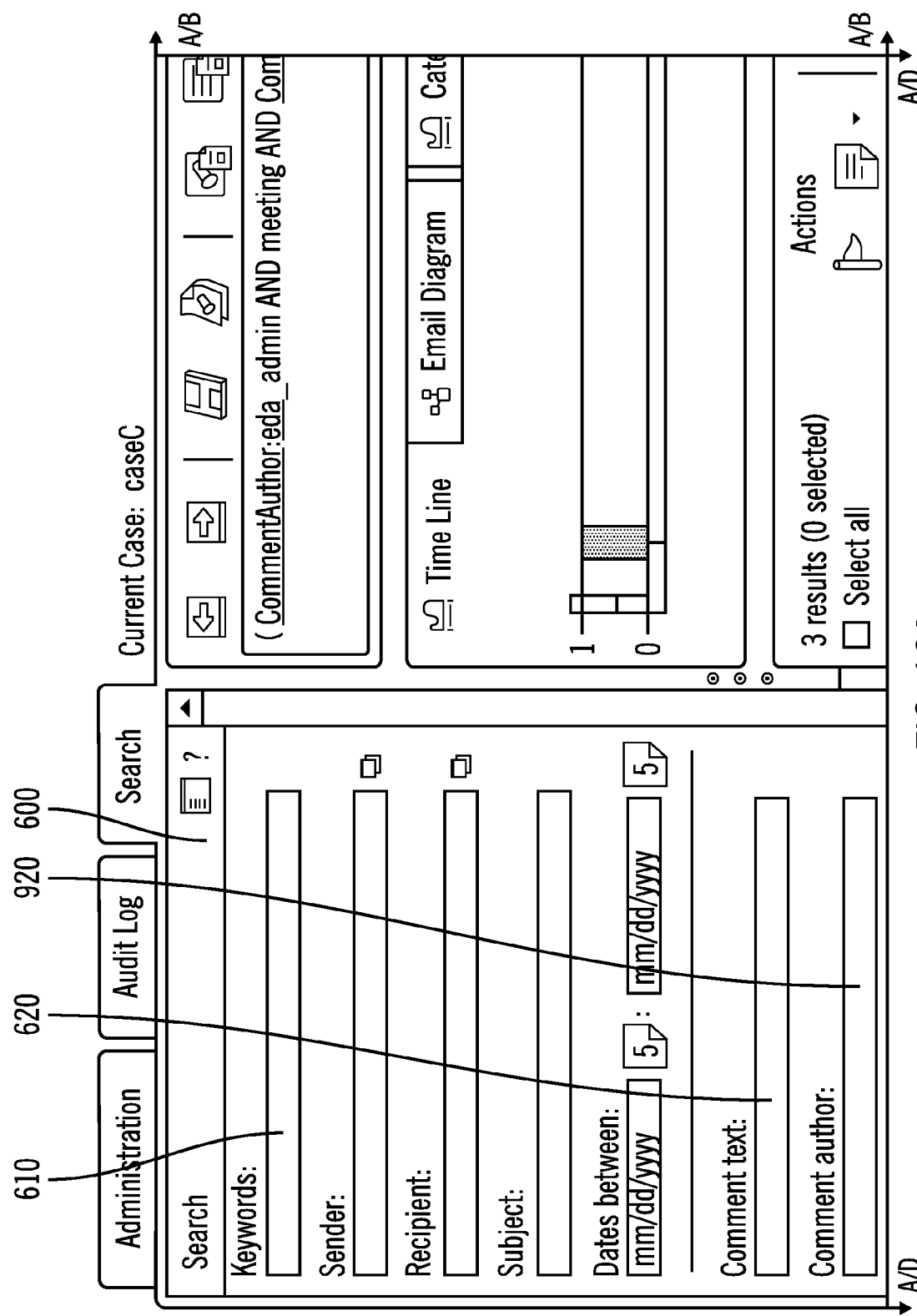
Figure 10B:
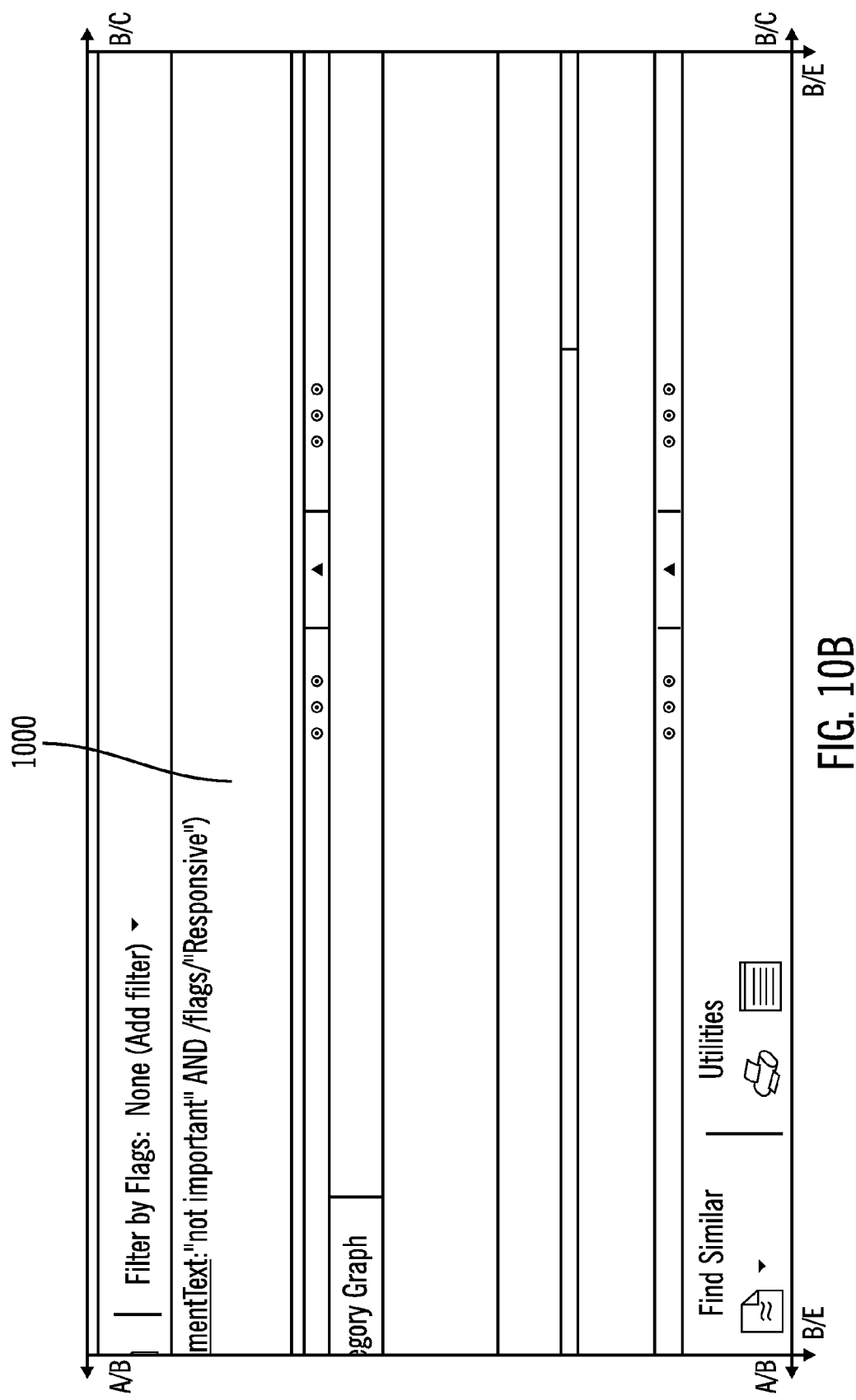
Figure 10C:
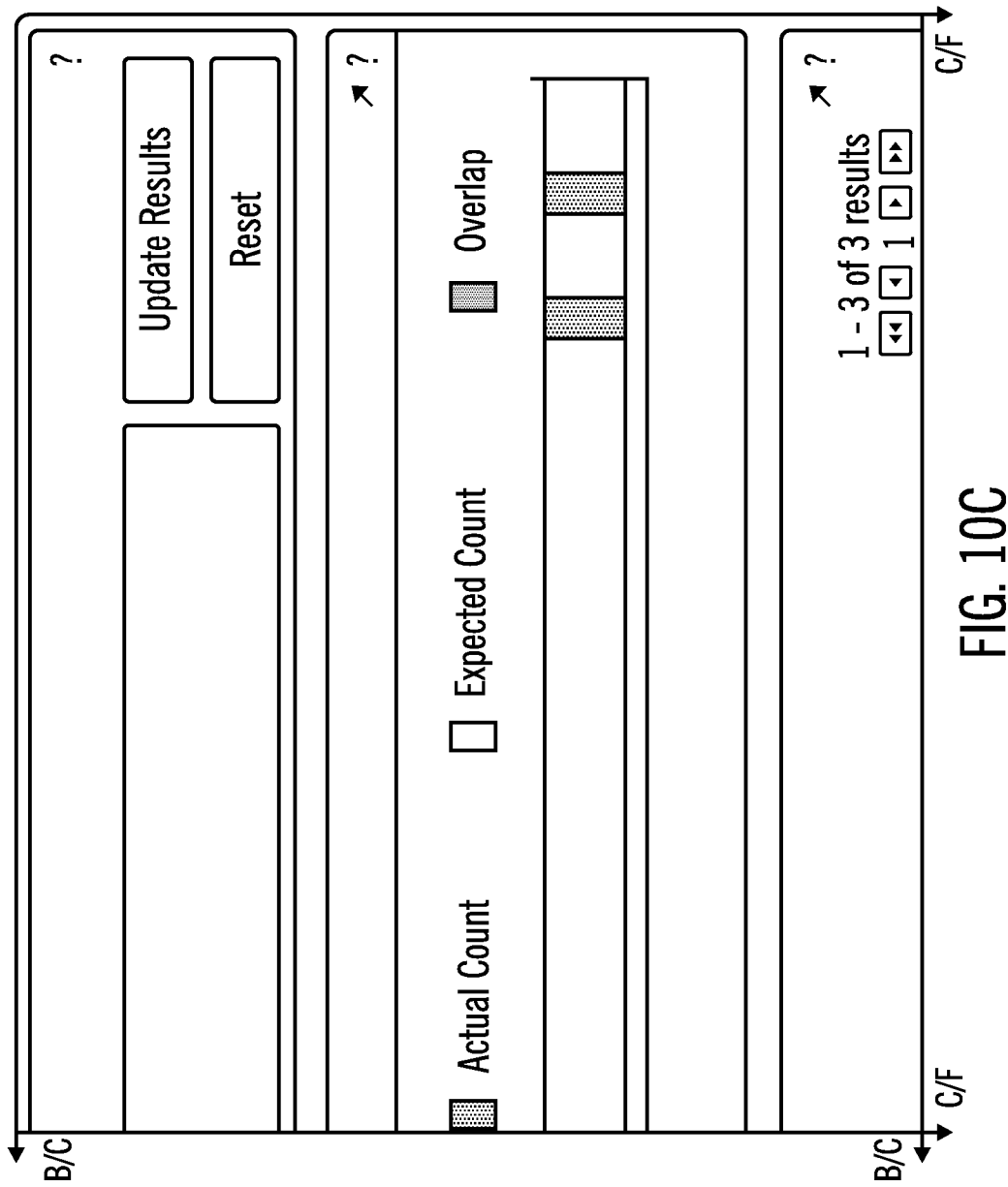
Figure 10F:
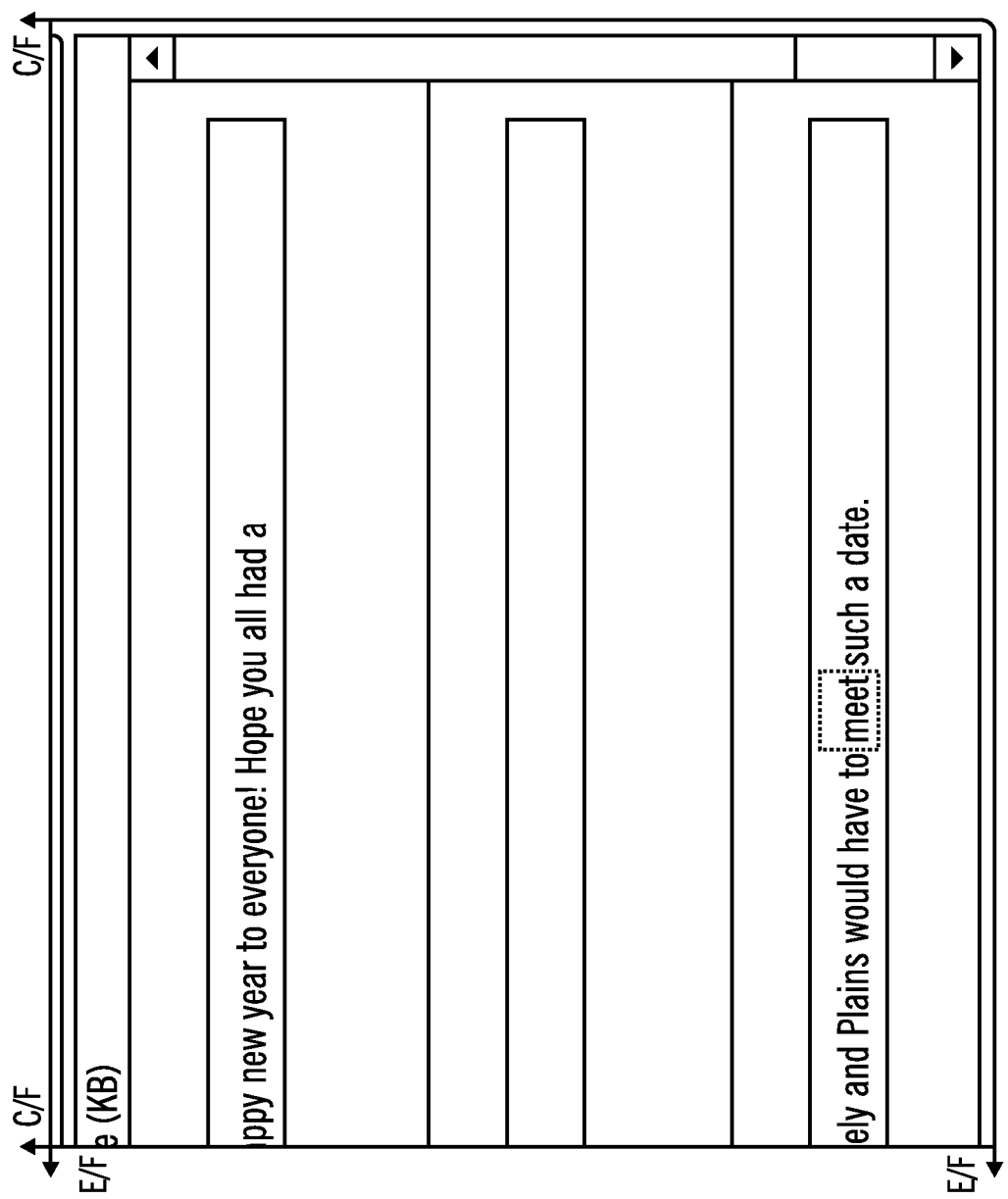

FIG. 5 illustrates, in a flow diagram, processing performed by an auxiliary processor 150 in accordance with certain embodiments. This processing is performed by each of the auxiliary processors 150 associated with an index 140, 160 for which there is a constraint in a query. Control begins at block 500 with the auxiliary query processor 150 generating a document ID iterator for an annotation posting list. The annotation posting list may not be in document order. In certain embodiments, the annotation posting list is ordered based on the constraint associated with the auxiliary index 160 being used. In block 502, the auxiliary query processor 150 re-orders the annotation posting list by document order (i.e., by document ID). This is an example of a document ID iterator for a re-ordered annotation posting list obtained in block 410 of FIG. 4A.

Thus, if a query spans multiple indexes, the RSVPII system 110 evaluates each annotation constraint separately and joins the results by document ID. In certain embodiments, the auxiliary indexes 160 may be ordered differently. In certain embodiments, the individual index results may not fit in memory.

Figure 9D:
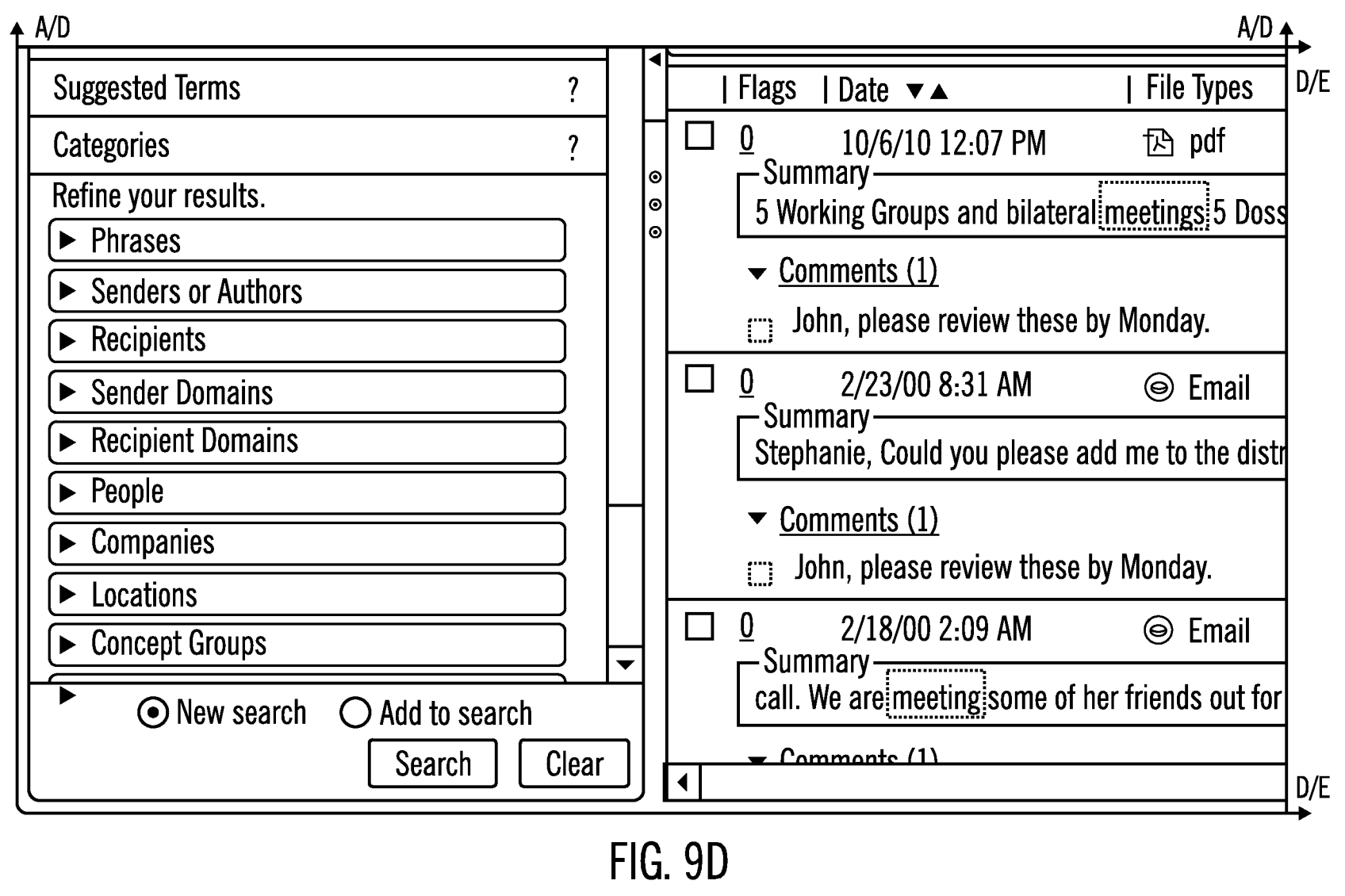

FIGS. 6A-10F illustrate, in block diagrams, user interfaces showing example queries in accordance with certain embodiments. In FIGS. 6A-6F, a search area 600 allows a user to enter keywords (i.e., document content) into a keywords element 610 and comment text (i.e., annotations) into a comment text element 620. In FIGS. 6A-6F, "comment text:John" 630 has been entered, and the RSVPII system 110 displays the results 640 of documents that have comment text including "John".

In FIGS. 7A-7F, "attorney AND CommentText:John" 700 has been entered, and the RSVPII system 110 displays the results 710 of documents that include "attorney" as document text and that have comment text including "John".

In FIGS. 8A-8F, "meeting AND CommentAuthor:eda_admin" 800 has been entered, and the RSVPII system 110 displays the results 810. Here, the comment author is the author of the comment, which is a comment metadata indexed at the time of index creation.

In FIGS. 8A-8F, a user has selected a category of "Senders or Authors 800", and in FIGS. 9A-9F, the search area 600 includes comment author element 920, which allows a user to enter an author. In FIGS. 9A-9F, "CommentAuthor:eda_admin AND meeting AND CommentText:monday" 900 has been entered, and the RSVPII system 110 displays the results 910. In this example, there are multiple annotation constraints: the "CommentAuthor:eda_admin" annotation constraint and the "CommentText:monday" annotation constraint. The RSVPII system 110 may issue the different annotation constraints against the same or different auxiliary indexes 160, depending on how the auxiliary indexes 160 are defined.

In FIGS. 10A-10F, "CommentAuthor:eda_admin AND meeting AND CommentText: 'not important' AND/flags/ "Responsive" 1000 has been entered, and the RSVPII system 110 displays the results 1010. Flags may be described as constraints that can be specified on a User Interface (UI).

Figure 11A:
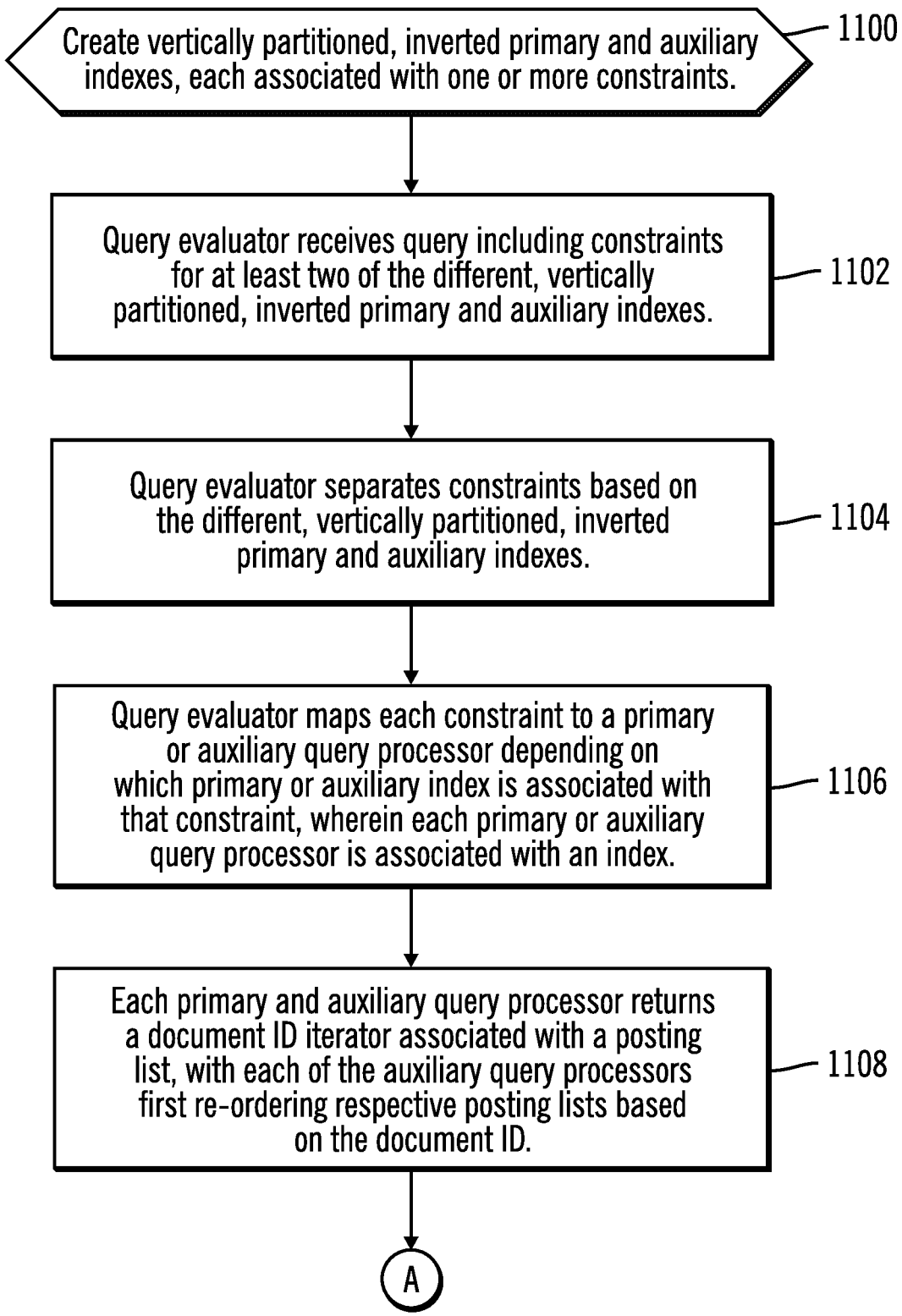
FIGS. 11A and 11B illustrate, in a flow diagram, processing to perform real-time search of vertically partitioned, inverted indexes in accordance with certain additional embodiments.
Figure 11B:
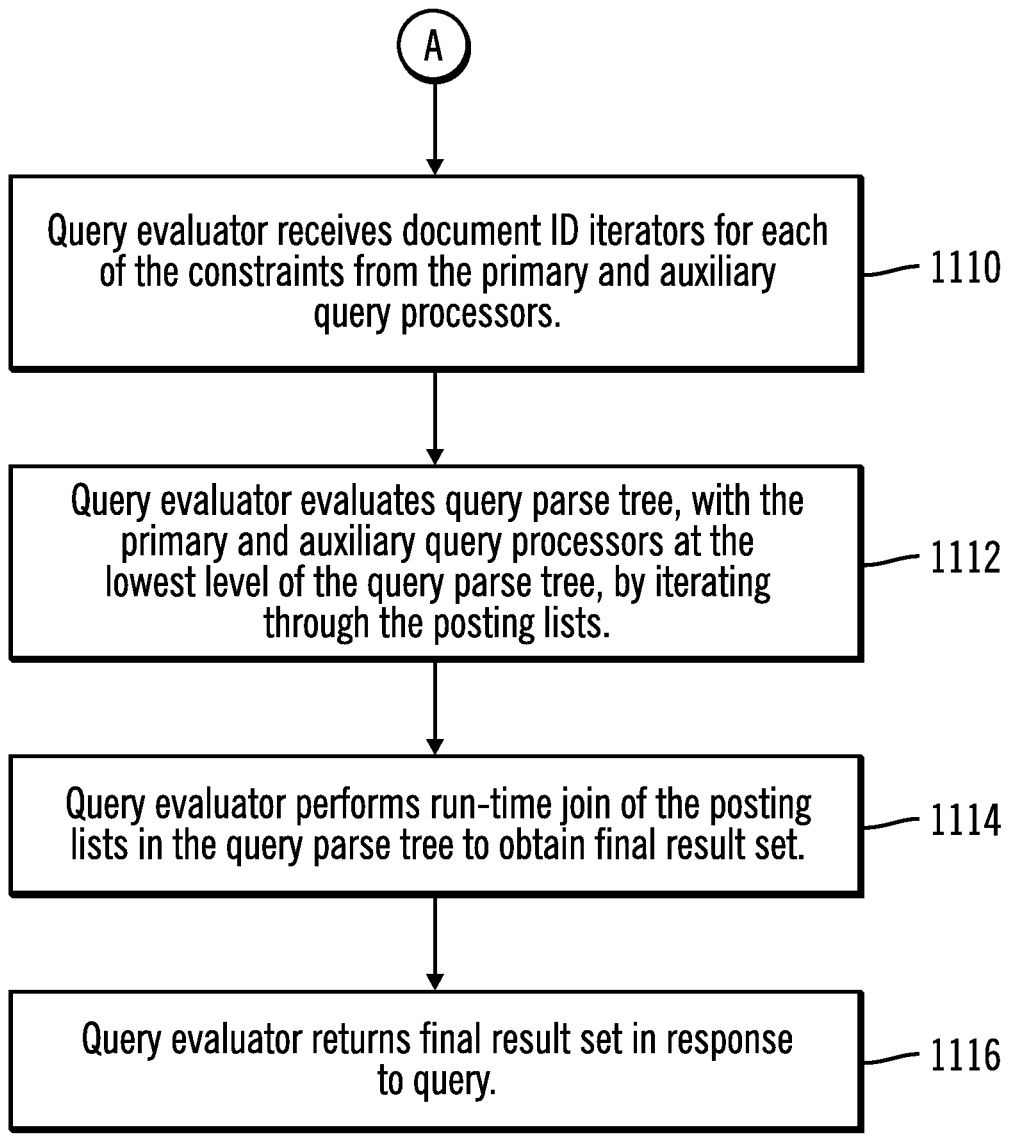

FIGS. 11A and 11B illustrate, in a flow diagram, processing to perform real-time search of vertically partitioned, inverted indexes in accordance with certain additional embodiments. Control begins at block 1100 with vertically partitioned, inverted primary and auxiliary indexes 140, 160 being created, with each of the vertically partitioned, inverted indexes 140, 160 associated with one or more constraints. In certain embodiments, the RSVPII system 110 creates the primary and auxiliary indexes 140, 160. In block 1102, the query evaluator 120 receives a query including constraints for at least two of the different, vertically partitioned, inverted primary and auxiliary indexes 140, 160. In block 1104, the query evaluator 120 separates constraints based on the different, vertically partitioned, inverted primary and auxiliary indexes 140, 160. In certain other embodiments, the query parser 115 may perform the separating. In block 1106, the query evaluator 120 maps each constraint to a primary or auxiliary query processor 130, 150 depending on which primary or auxiliary index 140, 160 is associated with that constraint, wherein each primary or auxiliary query processor 130, 150 is associated with one index 140, 160.

In block 1108, each primary and auxiliary query processor 130, 150 returns a document ID iterator associated with a posting list, with each of the auxiliary query processors 150 first re-ordering respective posting lists based on the document ID (i.e., re-ordering by document ID order). From block 1108 (FIG. 11A), processing continues to block 1110 (FIG. 11B).

In block 1110, the query evaluator 120 receives document ID iterators for each of the constraints from the primary and auxiliary query processors 130, 150. In block 1112, the query evaluator 120 evaluates the query parse tree, with the primary and auxiliary query processors 130, 150 at the lowest level of the query parse tree, by iterating through the posting lists. In block 1114, the query evaluator 120 performs a run-time join of the posting lists in the query parse tree to obtain a final result set. In block 1116, the query evaluator 120 returns the final result set in response to the query.

With the RSVPII system 110, a single query can have multiple constraints that apply to multiple inverted indexes. The RSVPII system 110 provides a technique to return search results from multiple inverted indexes with support for run-time joins on inverted indexes and support for search queries that span multiple inverted indexes. The RSVPII system 110 provides an indexing design to enable run-time joins. At index construction time, auxiliary index posting lists in the auxiliary indexes 160 encode the document IDs corresponding to the documents in the full primary index 140 to serve as foreign keys. The RSVPII system 110 leverages the posting list payload feature.

At query time, the RSVPII system 110 builds posting lists for each auxiliary index constraint in the query. These dynamically generated posting lists are stored in the full text index document order so that the query is efficiently executed. In certain embodiments, for high frequency terms, these posting lists are stored using compression techniques such as bit vectors.

In various embodiments, the RSVPII system 110 employs a run-time join of vertically partitioned indexes for various use cases. For instance, as social networks and their supporting technologies mature, the quantity and heterogeneity of user-generated content will grow over time. This growth will prompt the need for user-generated content to be used in conjunction with document content during search. For example, news articles are actively commented on and rated by readers. With the vertically partitioned inverted indexes provided by the RSVPII system 110, a user can query for articles on a topic of interest that is also popular based on comment counts and/or positive ratings. Product reviews and movie reviews are other examples of user-contributed content that other users may want to be able to query in conjunction with criteria of the product or movie.

In certain embodiments, the RSVPII system 110 employs a run-time join of vertically partitioned indexes for interactive document categorization. That is, users can categorize text documents (with rich feature vectors) interactively or using any other technology, and the RSVPII system 110 captures this newly added document information (i.e., the category) so that the document information can be searched or analyzed in real-time. For example, a text document may be categorized in a category, and the category is stored in an auxiliary index for search and analysis in real-time by the RSVPII system 110.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The RSVPII system 110, the query parser 115, the query evaluator 120, the primary processor 130, and/or the auxiliary processor 150 may be implemented as hardware (e.g., hardware logic or circuitry), software, or a combination of hardware and software.

Figure 12:
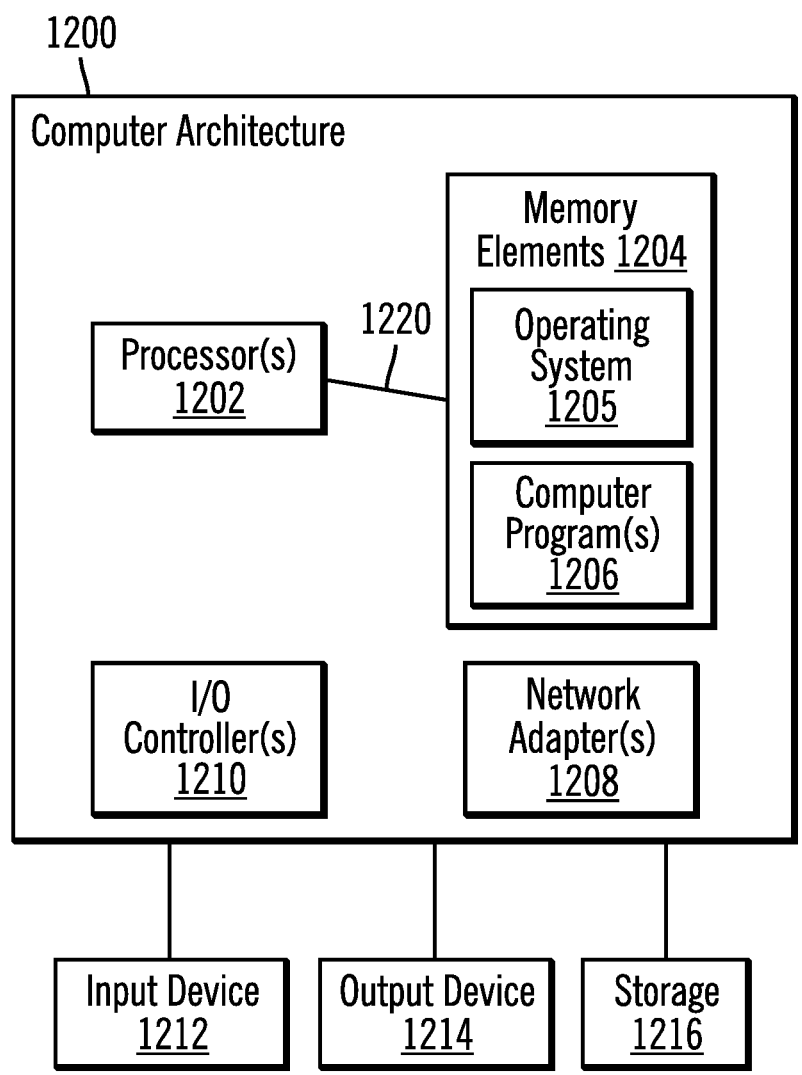
FIG. 12 illustrates, in a block diagram, a computer architecture that may be used in accordance with certain embodiments.

FIG. 12 illustrates a computer architecture 1200 that may be used in accordance with certain embodiments. Computing device 100 may implement computer architecture 1200. The computer architecture 1200 is suitable for storing and/or executing program code and includes at least one processor 1202 coupled directly or indirectly to memory elements 1204 through a system bus 1220. The memory elements 1204 may include local memory employed during actual execution of the program code, bulk storage, and cache memories which provide temporary storage of at least some program code in order to reduce the number of times code must be retrieved from bulk storage during execution. The memory elements 1204 include an operating system 1205 and one or more computer programs 1206.

Input/Output (I/O) devices 1212, 1214 (including but not limited to keyboards, displays, pointing devices, etc.) may be coupled to the system either directly or through intervening I/O controllers 1210.

Network adapters 1208 may also be coupled to the system to enable the data processing system to become coupled to other data processing systems or remote printers or storage devices through intervening private or public networks. Modems, cable modem and Ethernet cards are just a few of the currently available types of network adapters 1208.

The computer architecture 1200 may be coupled to storage 1216 (e.g., a non-volatile storage area, such as magnetic disk drives, optical disk drives, a tape drive, etc.). The storage 1216 may comprise an internal storage device or an attached or network accessible storage. Computer programs 1206 in storage 1216 may be loaded into the memory elements 1204 and executed by a processor 1202 in a manner known in the art.

The computer architecture 1200 may include fewer components than illustrated, additional components not illustrated herein, or some combination of the components illustrated and additional components. The computer architecture 1200 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for processing a query, comprising:
   receiving, using a processor of a computer, the query that includes a document constraint and an annotation constraint;
   parsing, using the processor of the computer, the query to separate the document constraint from the annotation constraint and to create a query parse tree with a primary query processor at a lowest level of the query parse tree and with an auxiliary query processor at the lowest level of the query parse tree;
   processing, using the processor of the computer, the document constraint with the primary query processor to generate a first posting list that is ordered by document identifier;
   processing, using the processor of the computer, the annotation constraint with the auxiliary query processor to generate a second posting list that is ordered by annotation identifier and that includes the document identifier associated with each annotation that is identified by the annotation identifier and that is re-ordered by the document identifier;
   evaluating, using the processor of the computer, the query parse tree with the primary query processor and with the auxiliary query processor by iterating through the first posting list and the second posting list; and
   performing, using the processor of the computer, a runtime join of the first posting list and the second posting list to obtain a final result set that combines documents and annotations that have a same document identifier with a union operation.

2. The method of claim 1, further comprising:
mapping the document constraint to the primary query processor and mapping the annotation constraint to the auxiliary query processor.

3. The method of claim 1, further comprising:
storing document identifiers in the primary index; and
at index construction time, storing the document identifiers in the auxiliary index, wherein the document identifiers comprise foreign keys.

4. The method of claim 1, further comprising:
returning the final result set in response to the received query that includes the document constraint and the annotation constraint.

5. The method of claim 1, wherein a text document is categorized in a category, and wherein the category is stored in the auxiliary index for search and analysis in real-time.

6. The method of claim 1, further comprising:
creating vertically partitioned, inverted indexes, with each of the vertically partitioned, inverted indexes associated with one or more constraints.

\* \* \* \* \*